US010797918B2

(12) United States Patent
Baldemair et al.

(10) Patent No.: US 10,797,918 B2
(45) Date of Patent: Oct. 6, 2020

(54) RESOURCE ALLOCATION FOR DATA TRANSMISSION IN WIRELESS SYSTEMS

(71) Applicant: Telefonaktiebolaget LM Ericsson (publ), Stockholm (SE)

(72) Inventors: Robert Baldemair, Solna (SE); Håkan Björkegren, Täby (SE); Erik Dahlman, Stockholm (SE); Stefan Parkvall, Bromma (SE); Karl Werner, Segeltorp (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/742,204

(22) PCT Filed: Jul. 6, 2015

(86) PCT No.: PCT/EP2015/065378
§ 371 (c)(1),
(2) Date: Jan. 5, 2018

(87) PCT Pub. No.: WO2017/005295
PCT Pub. Date: Jan. 12, 2017

(65) Prior Publication Data
US 2018/0199341 A1 Jul. 12, 2018

(51) Int. Cl.
*H04L 27/00* (2006.01)
*H04L 5/00* (2006.01)
(Continued)

(52) U.S. Cl.
CPC ........ *H04L 27/0008* (2013.01); *H04L 5/0028* (2013.01); *H04L 5/0064* (2013.01);
(Continued)

(58) Field of Classification Search
None
See application file for complete search history.

(56) References Cited

U.S. PATENT DOCUMENTS 5,822,372 A * 10/1998 Emami ............... H04L 5/0007
375/260
5,838,667 A * 11/1998 Bingham ............ H04L 5/023
370/294
(Continued)

FOREIGN PATENT DOCUMENTS

CN 101868031 A 10/2010
CN 102958173 A 3/2013
(Continued)

OTHER PUBLICATIONS

Unknown, Author, "Correction to RF General section on CA configurations", 3GPP TSG-RAN WG5 Meeting #64, R5-144809, Dresden, Germany, Aug. 18-22, 2014, 1-22.
(Continued)

*Primary Examiner* — Bunjob Jaroenchonwanit
(74) *Attorney, Agent, or Firm* — Murphy, Bilak & Homiller, PLLC

(57) ABSTRACT

Techniques are disclosed for allocating time-frequency resources in a system that uses multiple multicarrier modulation numerologies. According to one aspect, a method in a first wireless node comprises allocating (1310) time-frequency resources for use by a second wireless node, where said allocating comprises selecting, for use in multicarrier modulation in the allocated time-frequency resources, one of two or more subcarrier bandwidths that the second wireless node is adapted to use for modulating or demodulating of data. In some embodiments, the method further comprises sending (1320) resource allocation information to the second wireless node, the resource allocation information identifying the allocated time-frequency resources.

61 Claims, 17 Drawing Sheets

(51) Int. Cl.
  *H04L 27/26* (2006.01)
  *H04W 16/14* (2009.01)
  *H04L 1/00* (2006.01)

(52) U.S. Cl.
  CPC .......... *H04L 5/0087* (2013.01); *H04L 5/0091* (2013.01); *H04L 27/0012* (2013.01); *H04L 27/264* (2013.01); *H04W 16/14* (2013.01); *H04L 1/00* (2013.01); *H04L 5/006* (2013.01); *H04L 5/0007* (2013.01); *H04L 5/0066* (2013.01); *H04L 5/0085* (2013.01)

(56) References Cited

U.S. PATENT DOCUMENTS

| | | | | |
|---|---|---|---|---|
| 5,960,032 | A * | 9/1999 | Letaief | H04B 7/264 375/146 |
| 6,300,895 | B1 * | 10/2001 | Carrara | G01S 13/003 342/55 |
| 7,184,393 | B1 * | 2/2007 | Singh | H04L 5/0007 370/203 |
| 7,688,773 | B2 * | 3/2010 | Choi | H04J 13/16 370/320 |
| 7,904,093 | B2 * | 3/2011 | Nystrom | H04L 5/0048 455/450 |
| 8,009,755 | B2 * | 8/2011 | Halfmann | H04B 7/0417 375/267 |
| 9,209,956 | B2 * | 12/2015 | Gorokhov | H04L 5/0044 |
| 9,225,488 | B2 * | 12/2015 | Khandekar | H04L 5/0044 |
| 10,523,378 | B2 * | 12/2019 | Ashraf | H04L 5/0064 |
| 2002/0136320 | A1 * | 9/2002 | Jin | H04L 1/0043 375/265 |
| 2003/0147655 | A1 * | 8/2003 | Shattil | H04L 27/00 398/182 |
| 2004/0190482 | A1 * | 9/2004 | Baum | H04W 72/082 370/347 |
| 2004/0199554 | A1 * | 10/2004 | Aslanis | H04L 27/2665 |
| 2005/0180313 | A1 * | 8/2005 | Kim | H04L 1/0009 370/208 |
| 2005/0201295 | A1 * | 9/2005 | Kim | H04L 1/0026 370/241 |
| 2006/0160498 | A1 * | 7/2006 | Sudo | H03M 13/37 455/103 |
| 2007/0025458 | A1 * | 2/2007 | Kaminski | H04L 5/0007 375/260 |
| 2007/0105563 | A1 * | 5/2007 | Ro | H04W 28/24 455/452.2 |
| 2007/0189240 | A1 * | 8/2007 | Cho | H04L 5/0051 370/337 |
| 2007/0230350 | A1 * | 10/2007 | Heo | H04W 72/1289 370/235 |
| 2007/0248048 | A1 * | 10/2007 | Zhu | H04W 72/1242 370/329 |
| 2008/0031314 | A1 * | 2/2008 | Priotti | H04L 1/0001 375/227 |
| 2008/0205275 | A1 * | 8/2008 | Rinne | H04L 47/56 370/235 |
| 2008/0288852 | A1 * | 11/2008 | Uehara | H04L 1/0065 714/786 |
| 2009/0186645 | A1 * | 7/2009 | Jaturong | H04L 5/0007 455/507 |
| 2009/0200996 | A1 * | 8/2009 | Ojanen | H02M 3/156 323/234 |
| 2009/0279480 | A1 * | 11/2009 | Rosenqvist | H04L 1/1887 370/328 |
| 2010/0226416 | A1 * | 9/2010 | Dent | H04L 25/0202 375/219 |
| 2011/0019622 | A1 * | 1/2011 | Lee | H04L 5/0007 370/328 |
| 2011/0038430 | A1 * | 2/2011 | Yoshimoto | H04L 1/0069 375/259 |
| 2011/0211652 | A1 * | 9/2011 | Debbah | H04J 11/003 375/295 |
| 2012/0182950 | A1 * | 7/2012 | Chung | H04L 5/0053 370/329 |
| 2012/0287878 | A1 * | 11/2012 | Moon | H04L 5/001 370/329 |
| 2012/0300730 | A1 * | 11/2012 | Ode | H04L 27/261 370/329 |
| 2013/0114433 | A1 * | 5/2013 | Park | H04W 16/02 370/252 |
| 2013/0114527 | A1 * | 5/2013 | Yin | H04L 5/0007 370/329 |
| 2013/0115967 | A1 * | 5/2013 | Soliman | H04W 16/02 455/452.1 |
| 2013/0170464 | A1 * | 7/2013 | Hwang | H04W 72/082 370/329 |
| 2014/0029545 | A1 * | 1/2014 | Kim | H04L 1/1671 370/329 |
| 2014/0086201 | A1 * | 3/2014 | Nagata | H04L 5/0055 370/330 |
| 2014/0198678 | A1 * | 7/2014 | Kim | H04W 24/06 370/252 |
| 2014/0348075 | A1 * | 11/2014 | Kim | H04B 7/0626 370/329 |
| 2015/0023301 | A1 * | 1/2015 | Kim | H04L 1/0026 370/329 |
| 2015/0257136 | A1 * | 9/2015 | Li | H04W 72/042 370/329 |
| 2015/0341100 | A1 * | 11/2015 | Kwak | H04L 25/0224 370/329 |
| 2015/0341878 | A1 * | 11/2015 | Lee | H04W 56/004 370/329 |
| 2015/0351098 | A1 * | 12/2015 | Schellmann | H04L 5/0064 370/329 |
| 2016/0135185 | A1 * | 5/2016 | Chandrasekhar | H04W 16/14 370/329 |
| 2016/0227425 | A1 * | 8/2016 | Kim | H04L 5/0007 |
| 2016/0255630 | A1 * | 9/2016 | Etemad | H04L 5/003 370/329 |
| 2017/0142618 | A1 * | 5/2017 | Hahn | H04W 36/18 |
| 2017/0150480 | A1 * | 5/2017 | Kim | H04W 72/02 |
| 2017/0201317 | A1 * | 7/2017 | Lee | H04B 7/26 |
| 2017/0201996 | A1 * | 7/2017 | Brisebois | H04B 7/0626 |
| 2017/0207900 | A1 * | 7/2017 | Kim | H04L 1/1861 |
| 2017/0317868 | A1 * | 11/2017 | Lin | H04L 27/26 |
| 2017/0339641 | A1 * | 11/2017 | Nigam | H04W 52/0216 |
| 2017/0359746 | A1 * | 12/2017 | Lee | H04L 5/00 |
| 2018/0007673 | A1 * | 1/2018 | Fwu | H04W 4/70 |
| 2018/0152272 | A1 * | 5/2018 | Chae | H04W 8/005 |
| 2018/0152929 | A1 * | 5/2018 | Beale | H04L 5/0044 |
| 2018/0167112 | A1 * | 6/2018 | Lee | H04B 7/0469 |
| 2018/0191473 | A1 * | 7/2018 | Ashraf | H04L 5/0007 |
| 2018/0198649 | A1 * | 7/2018 | Lindoff | H04L 27/264 |
| 2018/0227893 | A1 * | 8/2018 | Park | H04W 72/042 |
| 2018/0255520 | A1 * | 9/2018 | Park | H04W 52/146 |
| 2018/0332588 | A1 * | 11/2018 | Yano | H04W 72/0406 |
| 2018/0343102 | A1 * | 11/2018 | Sebire | H04L 5/001 |
| 2019/0053065 | A1 * | 2/2019 | Zhao | H04W 72/10 |
| 2019/0069283 | A1 * | 2/2019 | Kim | H04W 72/044 |
| 2019/0109691 | A1 * | 4/2019 | Kim | H04W 24/10 |
| 2019/0253209 | A1 * | 8/2019 | Horiuchi | H04L 5/0048 |
| 2019/0313432 | A1 * | 10/2019 | Belghoul | H04L 5/0053 |
| 2019/0342892 | A1 * | 11/2019 | Seo | H04W 72/0453 |
| 2019/0363835 | A1 * | 11/2019 | Park | H04L 1/1812 |
| 2019/0386796 | A1 * | 12/2019 | Melodia | H04B 13/005 |
| 2020/0015205 | A1 * | 1/2020 | Dinan | H04W 72/0446 |
| 2020/0015221 | A1 * | 1/2020 | Kashiwagi | H04W 72/0413 |

FOREIGN PATENT DOCUMENTS

| | | |
|---|---|---|
| JP | 2013506383 A | 2/2013 |
| JP | 2014504474 A | 2/2014 |
| WO | 2011126008 A1 | 10/2011 |
| WO | 2014065568 A1 | 5/2014 |

(56) References Cited

FOREIGN PATENT DOCUMENTS

WO        2014114920 A1    7/2014
WO        2015099889 A1    7/2015

OTHER PUBLICATIONS

Unknown, Author, "Discussion on Scalable UMTS", 3GPP TSG-RAN WG1 Meeting #72, R1-130412, St. Julian's, Malta, Jan. 28-Feb. 1, 2013, 1-20.

Unknown, Author, "Impact of cross-carrier scheduling", 3GPP TSG-RAN WG2 #68, R2-096500, Jeju, Korea, Nov. 9-13, 2009, 1-5.

\* cited by examiner

RESOURCE ALLOCATION FOR DATA TRANSMISSION IN WIRELESS SYSTEMS

TECHNICAL FIELD

The present invention generally relates to wireless communication networks, and particularly relates to resource allocation in systems that employ multiple multicarrier modulation modes.

BACKGROUND

The so-called Long Term Evolution (LTE) wireless communication networks developed by members of the 3rd-Generation Partnership Project (3GPP) use orthogonal frequency-division multiplexing (OFDM) in the downlink and Discrete Fourier Transform spread (DFT-spread) OFDM (also referred to as single-carrier frequency-division multiple access, or FDMA) in the uplink, cf. "4G LTE/LTE Advanced for Mobile Broadband", 2011, Erik Dahlman, Stefan Parkvall & Johan Skold. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing/bandwidth as the downlink and the same number of single carrier FDMA (SC-FDMA) symbols in the time domain as OFDM symbols in the downlink.

In the time domain, LTE downlink transmissions are organized into radio frames of 10 ms, each radio frame consisting of ten equally-sized subframes of length Tsubframe=1 ms, as shown in FIG. 2. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of the control information. A downlink system with CFI=3 OFDM symbols as control is illustrated in FIG. 3.

The reference symbols shown in FIG. 3 are the cell specific reference symbols (CRS) and are used to support multiple functions including fine time and frequency synchronization and channel estimation for certain transmission modes.

While the development and deployment of LTE networks provides users with greatly increased wireless data rates and has enabled the development of a wide variety of mobile broadband (MBB) services, demand for these services continues to grow. In addition to this increased demand for improved bandwidth and performance, new applications for special-purpose devices, such as machine-to-machine (M2M) devices, continue to be developed. These market forces indicate that a wireless communications technology with improved flexibility is needed, to better match the variety of service requirements for mobile data applications.

SUMMARY

Techniques are disclosed herein for allocating time-frequency resources in a system that uses multiple multicarrier modulation numerologies.

According to a first aspect, a method in a first wireless node comprises allocating time-frequency resources for use by a second wireless node is provided, wherein said allocating comprises selecting, for use in multicarrier modulation in the allocated time-frequency resources, one of two or more subcarrier bandwidths that the second wireless node is adapted to use for modulating or demodulating of data. In some embodiments, the method further comprises sending resource allocation information to the second wireless node, the resource allocation information identifying the allocated time-frequency resources. In some embodiments, the resource allocation information relates to resources located in a bandwidth region corresponding to a different subcarrier bandwidth than the subcarrier bandwidth used for the transmission of the resource allocation information.

According to a second aspect, a method in a second wireless node comprises receiving resource allocation information identifying time-frequency resources allocated to the second wireless node. The method further includes determining, based on the received resource allocation information, one of two or more subcarrier bandwidths supported by the second wireless node for use in multicarrier modulation on the identified time-frequency resources.

According to a third aspect, a first wireless node is configured to allocate time-frequency resources for use by a second wireless node, wherein said allocating comprises selecting, for use in multicarrier modulation in the allocated time-frequency resources, one of two or more subcarrier bandwidths that the second wireless node is adapted to use for modulating or demodulating of data. In some embodiments, the first wireless node is further configured to send resource allocation information to the second wireless node, the resource allocation information identifying the allocated time-frequency resources.

According to a fourth aspect, a second wireless node is configured to receive resource allocation information identifying time-frequency resources allocated to the second wireless node, and to determine, based on the received resource allocation information, one of two or more subcarrier bandwidths supported by the second wireless node for use in multicarrier modulation on the identified time-frequency resources.

According to another aspect, a communication system comprises a first wireless node as described above and a second wireless node as described above. According to still another aspect, a method comprises, in a first wireless node, allocating time-frequency resources for use by a second wireless node, wherein said allocating comprises selecting, for use in multicarrier modulation in the allocated time-frequency resources, one of two or more subcarrier bandwidths that the second wireless node is adapted to use for modulating or demodulating of data, and, in the second wireless node, receiving resource allocation information identifying the time-frequency resources allocated to the second wireless node and determining, based on the received resource allocation information, one of two or more subcarrier bandwidths supported by the second wireless node for use in multicarrier modulation on the identified time-frequency resources.

According to another aspect, a computer program product comprises program instructions configured for execution by a processor in a first wireless node, wherein the program instructions are configured so as to cause the first wireless node to carry out a method according to the first aspect.

According to yet another aspect, a computer program product comprising program instructions configured for execution by a processor in a second wireless node, wherein the program instructions are configured so as to cause the second wireless node to carry out a method according to the second aspect.

It is an advantage of the present invention to efficiently make use of the bandwidth and/or resources available. The subcarrier bandwidth and/or the resources available may thus be adapted e.g. to comply with requirements of one or more services, in particular regarding data volume and/or latency. In the case of different subcarrier bandwidths the distribution of subcarrier bandwidths in a certain bandwidth region or subband region may hence be optimized in order to efficiently make use of the bandwidth region and/or subband region, respectively.

Various other methods and apparatus corresponding to the above aspects are detailed herein, as are additional details and refinements of these aspects. Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
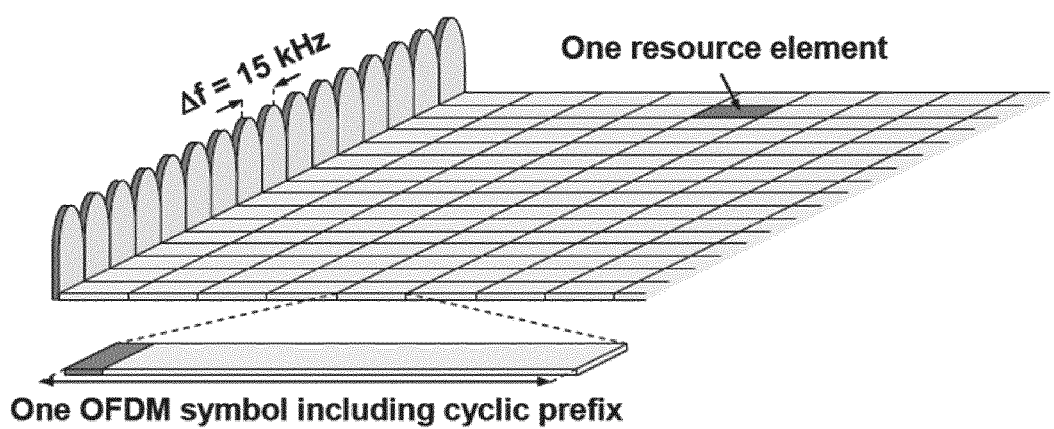
FIG. 1 illustrates a diagram illustrating an LTE downlink physical resource.
Figure 2:
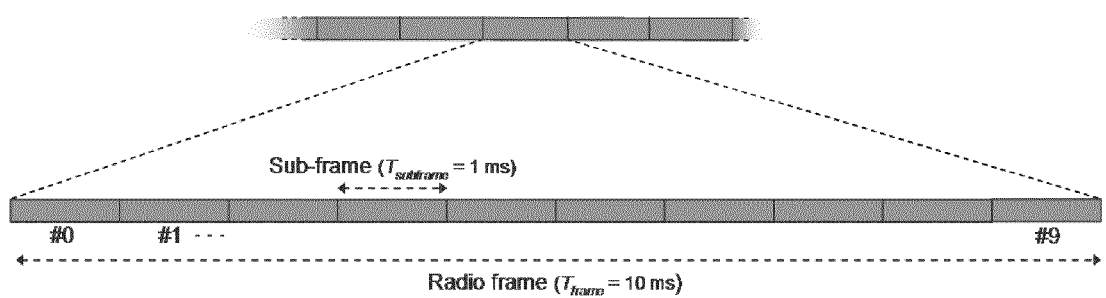
FIG. 2 illustrates a diagram of an LTE time-domain structure.
Figure 3:
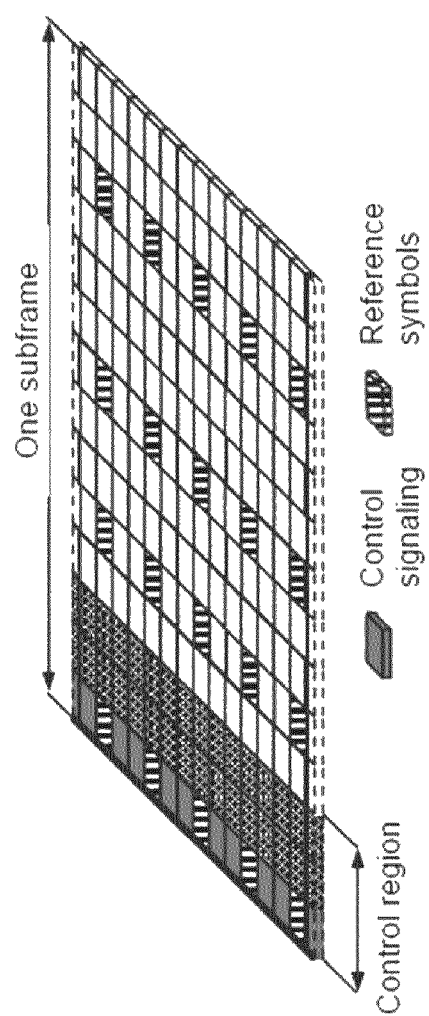
FIG. 3 illustrates a diagram of a downlink subframe.

There has been a rapid growth in the number of wireless devices and applications in recent years, and this trend is highly likely to continue in the future. This growth signals a need for a new radio access technology (RAT), which may be regarded as a "5G" ($5^{th}$-generation) wireless technology. One of the key goals of the current plans for 5G is to expand services offered by the network beyond mobile broadband (MBB). New use cases may come with new requirements. At the same time, 5G should also support a very wide frequency range and be very flexible when it comes to deployment options.

With the emergence of new applications with highly varying application needs, i.e., quality-of-service (QoS) parameters and deployment scenarios, a single, inflexible, physical-layer technology is not adequate to achieve the desired performance characteristics. For example, it is clear that some services require a shorter transmission time interval (TTI), compared to LTE, in order to reduce latency. In an OFDM system, shorter TTIs may be realized by changing subcarrier spacing or subcarrier bandwidth. (The terms subcarrier spacing and subcarrier bandwidth are used interchangeably herein.) Other services need support of relaxed synchronization requirements or very high robustness to delay spread—this may be done, in a system operating with cyclic prefix, by extending the cyclic prefix. These are just examples of possible requirements.

It is clear, however, that selecting parameters such as subcarrier spacing and cyclic prefix lengths is a tradeoff between conflicting goals. Thus, a radio access technology, e.g., the next generation, or "5G," RAT, advantageously provides flexible support for several variants of transmission parameters, commonly called "numerologies." Such transmission parameters might be symbol duration, which directly relates to subcarrier spacing in an OFDM system and in several other multicarrier modulation systems, number of subcarriers, or cyclic prefix duration.

Furthermore, it is beneficial to be able to simultaneously support several services on the same band. This allows for a dynamic allocation of resources (bandwidth for example) between the different services, and for efficient implementation and deployment. Thus, the simultaneous use of more than one numerology on the same transmission band is provided for.

In this context, a highly flexible physical layer for a future generation of cellular networks is currently being designed. This physical layer design is geared towards fulfilling a wide range of varying QoS requirements including latency, reliability and throughput. In this new physical layer design, the scalability is proposed to be adapted using different subcarrier spacing. Another feature is that it should support mixed-mode operation, which allows different subcarrier spacings to simultaneously coexist within the same frequency band. This technique is referred to as multi-mode multicarrier modulation or as involving multiple multicarrier modulation schemes; in this context, the terms "multicarrier modulation scheme" and "multicarrier modulation mode" should be regarded as interchangeable. Multi-mode is due to the fact that numerologies are mixed on the same carrier. Each mode has a specific choice of e.g. subcarrier spacing, cyclic prefix length and/or OFDM symbol length.

In the document "scheme" is used for the same thing. Is that a problem?

The essence of the mixed-mode operation contemplated herein is as follows: At a transmitting node, two or more multicarrier signals are generated, each being composed of one or more symbols, but the multicarrier signals having different transmission parameters, e.g., with respect to subcarrier spacing and/or symbol duration. In particular, the symbol durations for the two signals (and other parameters for the signals) are selected so that symbol borders align periodically, even though the symbol durations for the two signals may vary. In some embodiments, alignment is achieved with a 1 millisecond periodicity—this provides a good match to existing LTE techniques, so that LTE signals can be combined, in the same frequency band, with one or more other multicarrier signals having different subcarrier spacings and/or symbol durations.

Thus, in future networks (broadly referred to as "5G" networks), multi-mode multicarrier configuration is envisioned to meet the varying QoS requirements of different applications and services. New numerology for a new physical layer design to support these 5G networks is currently being proposed—this new numerology can support different subcarrier spacings (or, correspondingly, different OFDM symbol sizes), in different parts of the same transmission band. The different numerologies may be defined in a way such that different OFDM symbol lengths fit together very well, so as to facilitate inter-operability of different OFDM configurations.

Even though several of the specific examples provided herein are based on the use of OFDM as the base multicarrier modulation scheme, the techniques applies equally well if some or all of the signals are precoded OFDM transmissions, such as Discrete Fourier Transform Spread OFDM (DFTS-OFDM), which is also known as single-carrier frequency-division multiple access (SC-FDMA). It will be appreciated that the term "multicarrier modulation," as used herein, refers to any of these schemes as well as to other multicarrier modulation schemes. Thus, references herein to different multicarrier modulation schemes may refer to differences in the underlying modulation technique, or to differences in the multicarrier modulation parameters (e.g., symbol duration and/or subcarrier spacings), or both.

The techniques described herein pertain to a system that, in some embodiments, is configured to transmit multiple multicarrier signals simultaneously, the signals having different multicarrier modulation parameters (numerologies), e.g., with respect to symbol length, subcarrier spacing, etc. Each signal consists of a sequence of symbols (for example OFDM symbols) and guard periods (for example cyclic prefixes or guard periods consisting of zeros).

Figure 4:
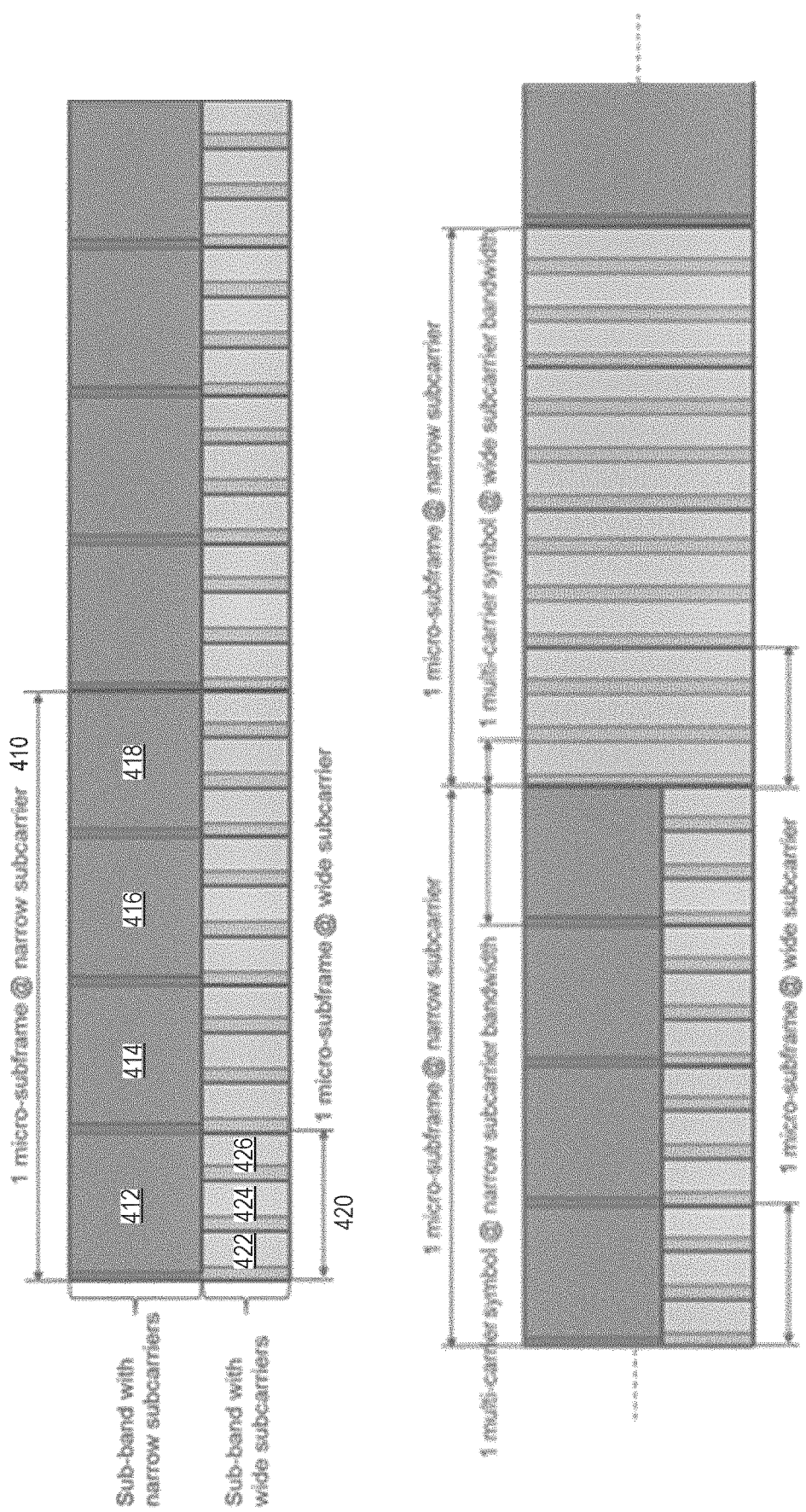
FIG. 4 illustrates multi-mode multicarrier modulation configurations, according to some embodiments.

FIG. 4 illustrates two cases of multi-mode configurations, as a non-limiting example of how a transmitting node may simultaneously employ two multicarrier modulation schemes. Here, micro-subframes are defined—each micro-subframe can be equal to a few OFDM symbols. As an example, one micro-subframe 410 in FIG. 4 is shown to consist of four "long" OFDM symbols 412, 414, 416 and 418. (Each symbol in the illustration includes a cyclic prefix.) The new numerology allows inter-operability of different multicarrier modulation modes, characterized by different sub-carrier spacings and/or different symbol lengths. In the example illustrated in FIG. 4, one micro-subframe 410 with narrow subcarrier spacing and correspondingly long OFDM symbols 412, 414, 416, and 418, is equal to four micro-subframes 420 with wide subcarrier spacing and correspondingly short OFDM symbols 422, 424, 426, etc. In the illustrated example, then, the symbols are aligned, once per each larger micro-subframe.

It should be noted that while FIG. 4 illustrates examples where two multicarrier modulation modes are used, more than two modes can also be supported in a mixed mode OFDM framework. Those familiar with the details of OFDM modulators and demodulators will appreciate that the mode selection, i.e., the selection of the OFDM symbol length and the sub-carrier spacing for a given multicarrier modulation mode, can be achieved by appropriate selection of the IFFT/FFT size used to modulate and demodulate the signal, in combination with a given sample rate. In LTE, the subcarrier spacing is fixed at 15 kHz, and the symbol duration is set so that either 7 symbols ("normal" cyclic prefix) or 6 symbols (extended cyclic prefix) fit within a 500 microsecond slot. With the approach planned for this new physical layer, a multicarrier modulation mode like (if not identical to) the OFDM modulation used in LTE can be used in the same frequency band, and at the same time, as one or more other multicarrier modulation modes having, for example, wider subcarrier spacings and shorter symbol durations.

One of the issues with the existing LTE standard is that it uses a fixed large-sized subframe structure, which results in resource wastage for very small-sized data as is often the case in critical machine-type communication (C-MTC) scenarios. Moreover, due to relatively coarse time granularity, the LTE resource blocks simply do not meet the very low latency requirements of C-MTC applications. A second issue with the existing LTE standard is that all the different services are bound to using the same subframe structure; the subframe cannot be split among different users in order to support any emerging time-critical data services for C-MTC applications.

Both of these issues are addressed by the multi-mode techniques described herein. C-MTC applications can be serviced with, for example, a multicarrier modulation mode having a relatively wide subcarrier spacing and relatively short symbol duration, e.g., as compared to those used in LTE. This, in turn, facilitates communication with these applications using relatively shorter micro-subframes, such as the micro-subframes 420 shown in FIG. 4. At the same time, mobile broadband (MBB) applications can be serviced with a separate multicarrier modulation mode, in a disjunct and/or adjacent bandwidth region, having a relatively narrower subcarrier spacing and relatively longer OFDM symbol durations. However the different/separate multicarrier modulation modes can make use of the same or overlapping bandwidth regions at different times. The bandwidth allocation to a certain numerologies may be dynamically adapted to meet demands, such as data volume, latency, and/or traffic or the priority of certain applications or services.

Figure 5:
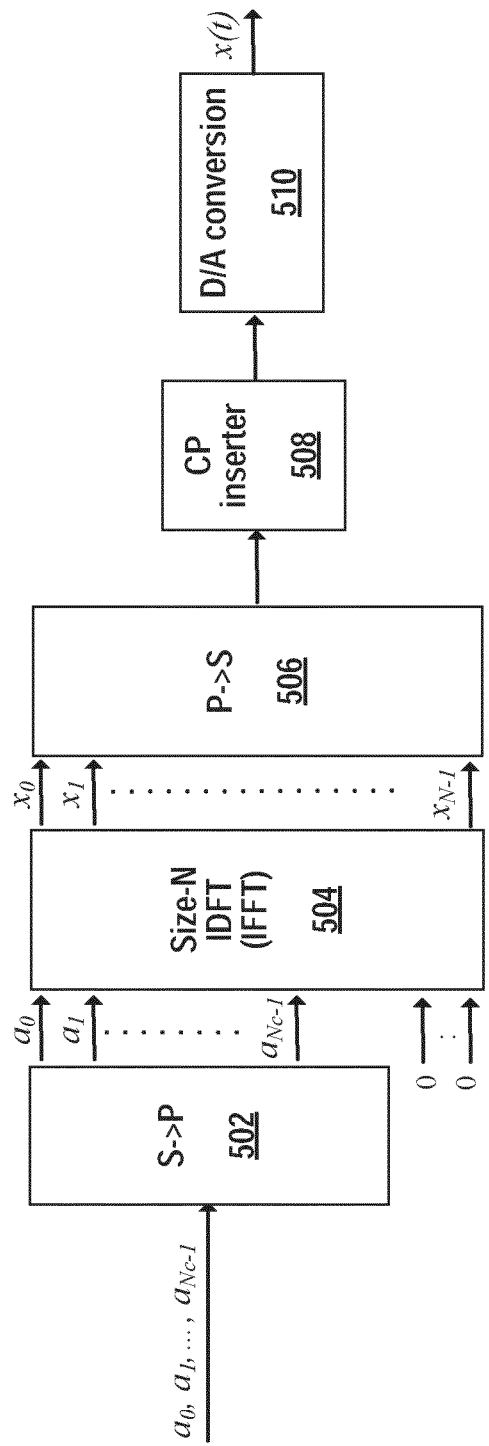
FIG. 5 illustrates a block diagram of an OFDM modulation scheme that can be used in some embodiments.

FIG. 5 illustrates OFDM modulation using an Inverse Fast Fourier Transform (IFFT) or, more generally, and Inverse Discrete Fourier Transform (IDFT). As will be explained in further detail below, two or more simultaneous instantiations of the signal processing configuration shown in FIG. 5 can be used for multi-mode operation. As indicated by the diagrams of FIG. 4, the number of OFDM subcarriers $N_c$ and the subcarrier spacing can vary. The number of subcarriers $N_c$ can range from fewer than a hundred to several thousand, depending on the subcarrier spacing that is selected and the overall transmission bandwidth.

As illustrated by FIG. 5, during each OFDM time interval, $N_c$ modulated symbols $a_0$ to $a_{N_c-1}$ are provided to the size-N IDFT 504 by the serial to parallel converter 502. The IFFT size corresponds to the total number of subcarriers that may be generated; the actual number of generated subcarriers is $N_c$ in FIG. 5.

The parallel output of IDFT 504 is converted to a serial time sequence by parallel-to-serial converter 506. Cyclic prefix inserter 508 inserts a copy of part of the OFDM symbol at the beginning of the OFDM symbol, to make the OFDM signal less sensitive to time dispersion. Following the digital to analog conversion by converter 510, the final output signal x(t) is then prepared for transmission.

Figure 6:
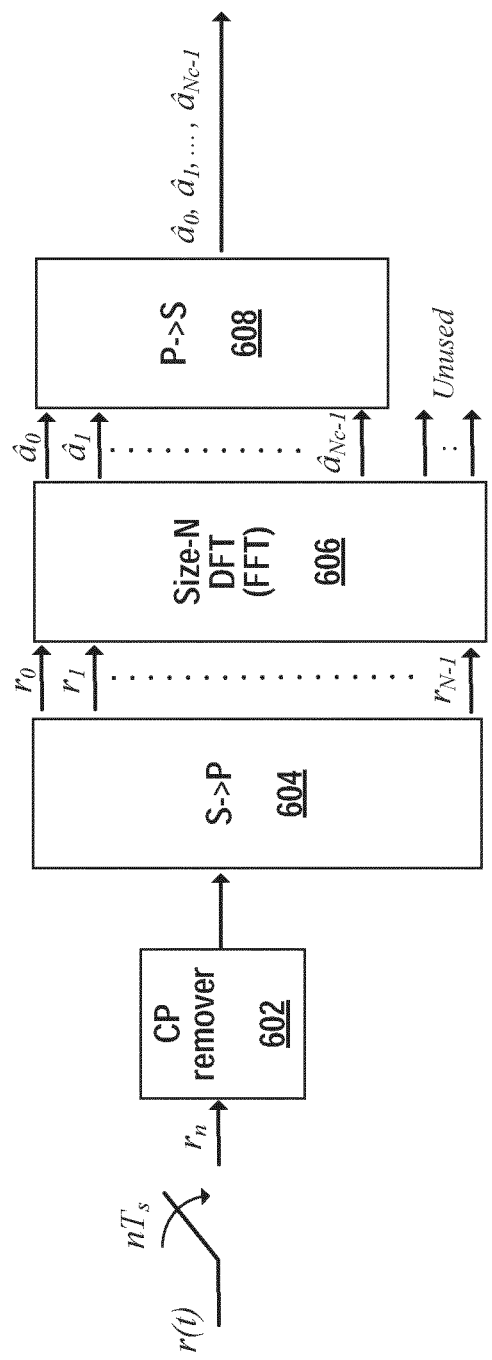
FIG. 6 illustrates a block diagram of an OFDM demodulation scheme that can be used in some embodiments.

FIG. 6 illustrates demodulation using FFT processing or, more generally, DFT processing. The received signal r(t) is sampled, and has its cyclic prefix removed by CP remover 602. The serial to parallel converter 604 provides the samples of the OFDM symbol to the size-N DFT 606, which extracts the data symbol values from the multiple subcarriers of the modulated signal. These data symbols are then converted to a serial stream of data symbols by parallel-to-serial converter 608. These data symbols are then individually demodulated and the resulting data is decoded.

Figure 7:
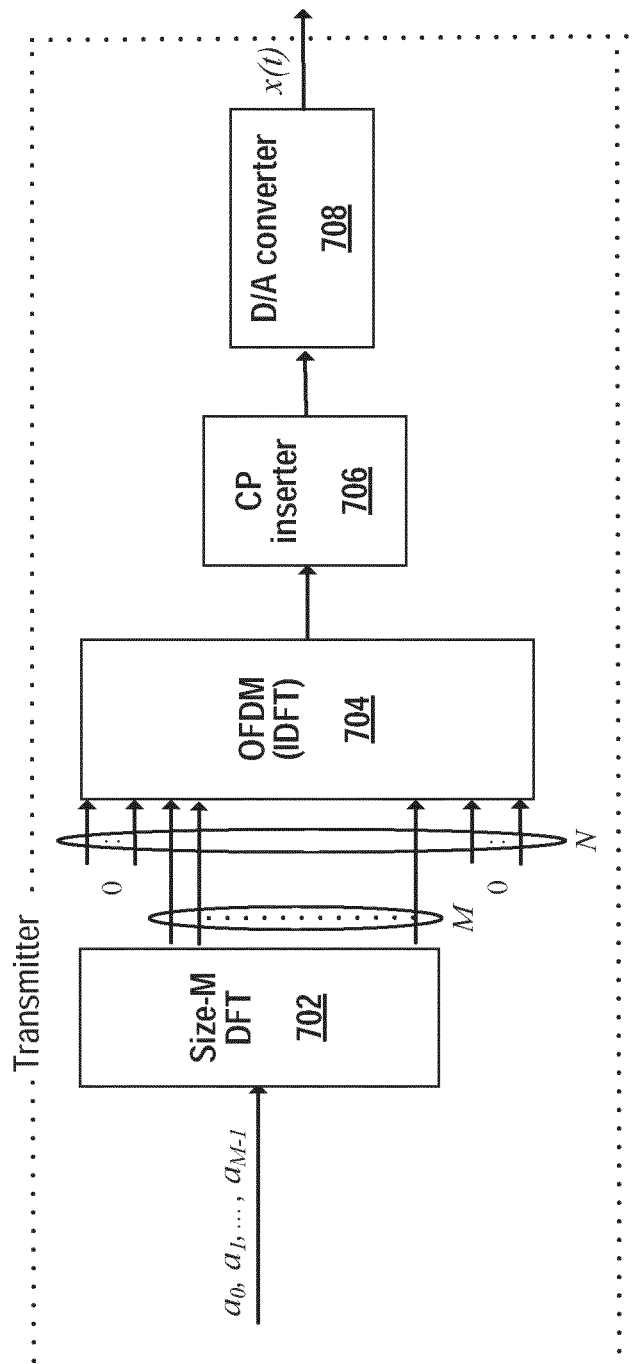
FIG. 7 illustrates a block diagram of a DFTS-OFDM modulation scheme that can be used in some embodiments.

FIG. 7 illustrates OFDM modulation with DFT-based precoding, or DFT-Spread OFDM (DFTS-OFDM), which can be referred to as single-carrier frequency division multiple access (SC-FDMA). A block of M modulation symbols is applied to Size-M DFT 702. The output of the DFT 702 is then applied to inputs of an OFDM modulator 704 that is implemented as a size-N IDFT; each input of the OFDM modulator 704 corresponds to a subcarrier of the resulting modulated signal. After conversion of the IDFT output to a time sequence in OFDM modulator 704, cyclic prefix inserter 706 inserts a cyclic prefix. Finally, output signal x(t) is output following conversion by digital-to-analog converter 708.

Figure 8:
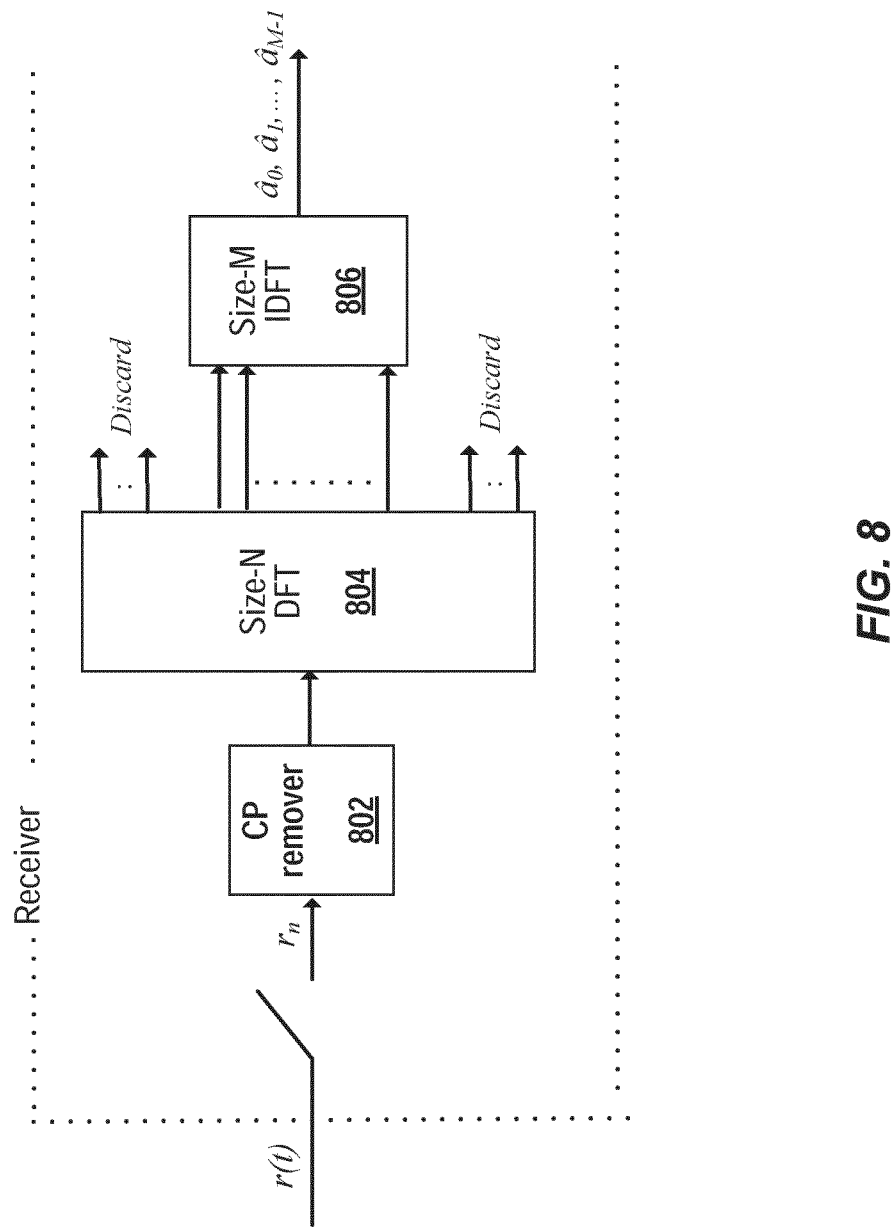
FIG. 8 illustrates a block diagram of a DFTS-OFDM demodulation scheme that can be used in some embodiments.

FIG. 8 illustrates DFTS-OFDM demodulation where a received signal r(t) is processed by cyclic prefix remover 802, Size-N DFT 804 and Size-M IDFT 806. It will be appreciated that the DFTS-OFDM demodulator shown in FIG. 8 is similar to the OFDM demodulator of FIG. 6, but with the size-M IDFT 806 added.

As previously mentioned, although OFDM and DFTS-OFDM are described as example multicarrier modulation/demodulation techniques, the embodiments of the present invention are not limited to such techniques. Also, it is noted that the equalization (which may be done in the frequency domain) is omitted from the figures for simplicity.

Figure 9:
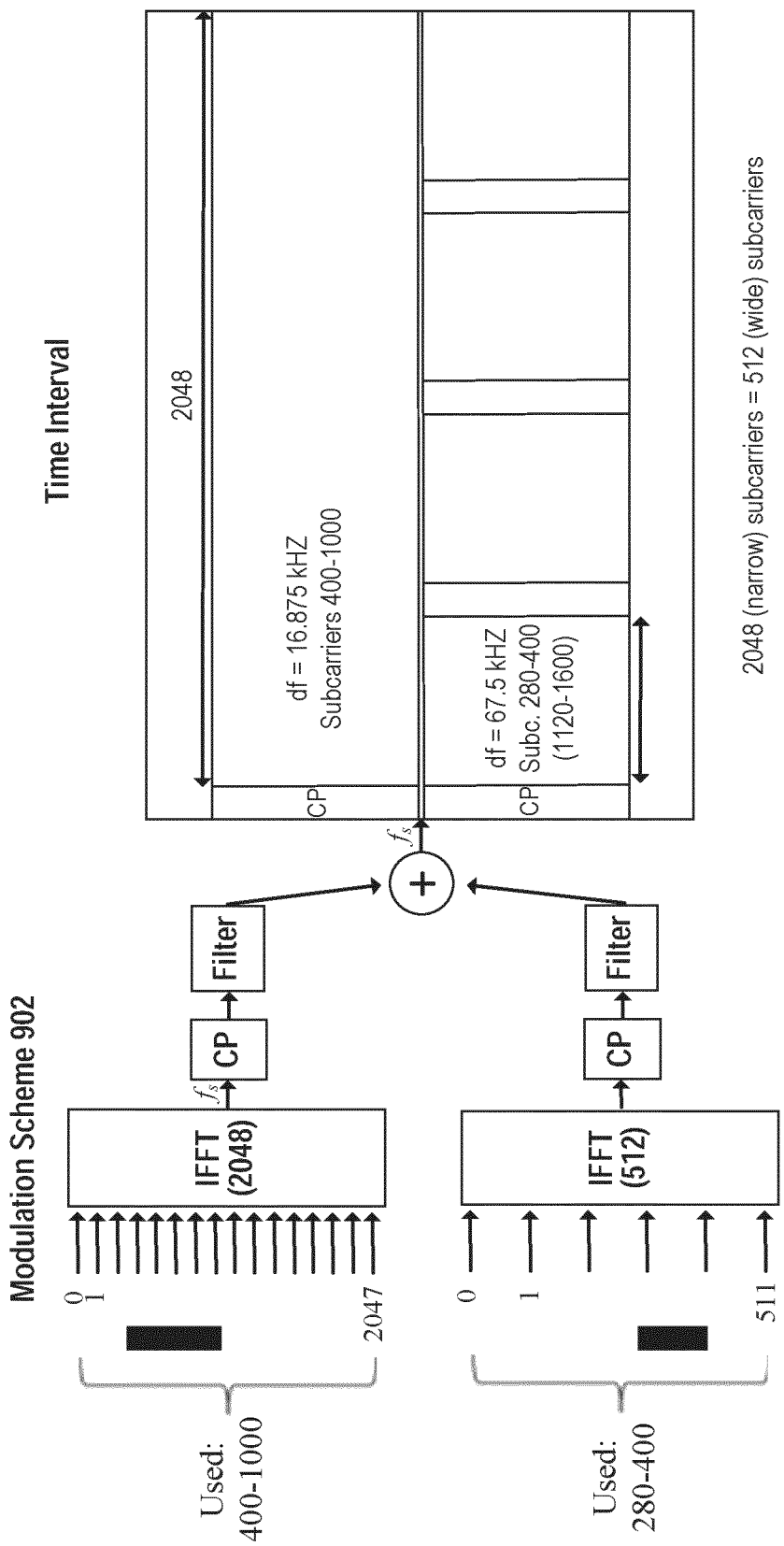
FIG. 9 illustrates signal generation using multiple IFFT modulation schemes in each time interval, according to some embodiments.

The IFFT size can be selected for modulation schemes with different numerologies, or variants of transmission parameters. The resulting allocations can provide for symbols with different subcarrier spacings in different frequency band portions of the same time interval. For example, FIG. 9 shows two simultaneously applied multicarrier modulators 902 and 904. Modulator 902 operates with an IFFT size of 2048, and is capable of outputting 2048 relatively narrow modulated subcarriers, while modulator 904 operates with an IFFT size of 512. Modulator 904 produces up to 512 subcarriers that are four times as wide as those from modulator 902, while also producing symbols that are one-fourth as long.

In the illustrated example, subcarriers 400-1000 of modulator 902 are generated, each having a bandwidth of 16.875 kHz, while the subcarriers 280-400 from modulator 904 each have a bandwidth of 67.5 kHz. It will be appreciated that the ranges of inputs used in modulators 902 and 904 are selected so that the resulting subcarriers do not land on each other. In the illustrated example, the 121 relatively wide subcarriers from modulator 904 correspond to the portion of the spectrum that would be occupied by subcarriers 1120-1600 of modulator 902. The corresponding inputs of modulator are thus not used. This provides a small gap, in the frequency domain, between the outputs from the two multicarrier modulators, which means that the two modulated signals can simply be added to one another, in the time domain, before transmission. The result is that in a given time interval, modulation scheme 902 provides longer blocks of symbols for a first non-overlapping portion of the frequency band, while modulation scheme 904 provides shorter blocks of symbols in a greater number of spacings in a second non-overlapping portion of the frequency band. As a result, symbols can be directed to different receiver nodes using different subcarrier spacings, all within the same time interval.

Thus, different multicarrier modulation schemes, or modes, may be used for different portions of the frequency band. More particularly, this means that a first portion of the frequency band can contain a first signal having a first integer number of symbol intervals in each of one or more time intervals of a predetermined length, while a second portion of the band simultaneously contains a second signal having a second integer number of symbol intervals in each of the one or more time intervals of the predetermined length, the second integer number differing from the first integer number. These signals can be simultaneously transmitted in the frequency band, such that the first and second signals are frequency-domain multiplexed in the frequency band. Further, this may be done in such a way that a symbol interval starting time in the first signal is aligned with a corresponding symbol interval starting time in the second signal at least once per time interval. A multicarrier modulation mode corresponds to a specific choice of numerology. The numerology may be defined by the subcarrier spacing, the length of the cyclic prefix and/or the OFDM symbol length in time.

This means that the subcarrier spacing and/or symbol durations can differ in different portions of the frequency band. While two multicarrier modulation modes are combined in the example shown in FIG. 9, it will be appreciated that this can be extended to three, four, or more multicarrier modulation modes, so long as non-colliding portions of the frequency band are allocated to the multiple modulators.

It should be understood that Orthogonal Frequency-Division Multiplexing (OFDM) is but one example of a multicarrier modulation technique. Other examples include discrete-Fourier-transform-spread (DFT-spread- or DFTS-) OFDM, which is also referred to single-carrier frequency-division multiple access (SC-FDMA) or precoded OFDM. Still other examples include filter-bank multicarrier (FBMC) modulation, pre-coded FBMC, and Generalized Frequency-Division Multiplexing (GFDM). Those familiar with these techniques will recognize that the digital signal processing for each of these techniques will vary, but should appreciate that any one or more of these multicarrier modulation techniques may be employed in the multi-mode schemes detailed herein—accordingly, where example embodiments are described herein in terms of OFDM, the described techniques and apparatus may employ one or more other multicarrier modulation techniques in addition to or instead of OFDM.

With the techniques described above, several services can be more optimally supported on the same band. This allows for dynamic allocation of resources (bandwidth for example) between the different services, and for efficient implementation and deployment. A mobile broadband (MBB) terminal may, for example, be served with a subcarrier bandwidth of 16.875 kHz (or 15 kHz). A typical cyclic prefix is less than 5 μs and constitutes an overhead of less than 10%. Another device, e.g., an MTC device, might be served with a subcarrier bandwidth of 67.5 kHz (or 60 kHz, or 75 kHz). To match the same deployment as the MBB terminal, a similar long guard interval is needed. A guard interval can be a cyclic prefix, a known word, or a true guard interval consisting of zero-valued samples. In the present disclosure, the term guard interval is used to refer to any of them.

The duration of an OFDM symbol is the inverse of the subcarrier bandwidth, i.e. $1/\Delta f$. In other words, an OFDM symbol with wide subcarriers is shorter than an OFDM symbol with narrow subcarriers. For example, the symbol duration of an OFDM symbol with $\Delta f1=16.875$ kHz is $1/\Delta f1=59$ μs and with $\Delta f2=67.5$ kHz the symbol duration is $1/\Delta f2=15$ μs. A guard interval of 3 μs constitutes an overhead of 5% and 20% for OFDM symbols with $\Delta f1=16.875$ kHz and $\Delta f2=67.5$ kHz wide subcarriers, respectively. The amount of resources (subcarriers) set aside for an MTC service, for example, should be minimized (matched to the amount needed) due to the large overhead. Operating the complete bandwidth with $\Delta f2=67.5$ kHz would simplify the communication system (allowing the use of OFDM over the entire bandwidth, and not requiring Filtered OFDM) but would have unacceptable performance due to large overhead.

Another use case could be mixing of $\Delta f1=16.875$ kHz and $\Delta f2=5.625$ kHz (i.e., a numerology with an even narrower subcarrier spacing) for a different kind of MTC service. While the cyclic prefix overhead of this numerology is lower than for $\Delta f1=16.875$ kHz, the subcarrier bandwidth is very narrow and supports only slowly moving terminals, due to Doppler robustness. Therefore, the quantity of resources (subcarriers) set aside with $\Delta f2=5.625$ kHz should again be matched to the required needs.

One issue with the mixing of numerologies in a single band is that the different numerologies (e.g., OFDM subcarrier bandwidths) are not orthogonal to each other, i.e. a subcarrier with subcarrier bandwidth $\Delta f1$ interferes with a subcarrier of bandwidth $\Delta f2$. In Filtered OFDM, filtering is introduced to suppress interference between the different numerologies.

Filtering—especially with steep transition regions—is tricky for very narrowband pass bands. Therefore it is likely that the smallest bandwidth a numerology can occupy on a band is several subcarriers wide. Let us say that subcarrier bandwidth $\Delta f1$ is used for MBB while $\Delta f2$ is used for another service, e.g., some kind of MTC service. To enable reasonable filtering, the resources (subcarriers) that must be set aside for each numerology must exceed a certain minimum. If the MTC service itself requires fewer resources than the minimum amount dictated by the filtering, these resources are left unused since they cannot be used by MBB terminals that operate only with subcarrier bandwidth $\Delta f1$. This leads to an inefficient resource usage.

As the multi-mode multicarrier modulation techniques described above are deployed, at least some mobile terminals should support the simultaneous reception of OFDM signals with different numerologies. For instance, for an MBB terminal, the main numerology would be $\Delta f1=16.875$ kHz (or 15 kHz). This terminal could be configured to receive at least parts of its control signaling (downlink assignment, uplink grants) in the band region with $\Delta f1$. If unused resources exist in a band region operating with $\Delta f2=67.5$ kHz (or 60 kHz or 75 kHz), it should be possible to make these resources available to the terminal. This can be done by inserting information into the control signaling indicating the numerology (e.g., OFDM subcarrier bandwidth) of the scheduled resources. Alternatively the terminal could have search spaces configured in both band regions.

Several techniques for allocating resources in a multi-mode multicarrier modulation environment and signaling those resource allocations to mobile terminals are detailed below. Although these techniques are outlined with respect to OFDM, the techniques apply equally well if some or all of the signals are precoded OFDM transmissions, such as Discrete Fourier Transform Spread OFDM (DFTS-OFDM), also known as SC-FDMA. Likewise, while the techniques are generally explained and illustrated with respect to the use of two different numerologies on a band, it should be appreciated that the techniques can be readily expanded to systems where more than two numerologies are used and/or supported by devices.

According to some embodiments of the presently disclosed techniques, the resource allocation provided to a wireless device in control information contains information related to the OFDM numerology of the indicated resources, where the numerology refers to a subcarrier bandwidth or a related parameter, a bandwidth, guard interval duration, etc. The size of the OFDM numerology information provided in the resource allocation information sent to the wireless device depends, in some cases, on how many numerologies can be used simultaneously on a band. It may also depend on how many numerologies the particular terminal may receive (in some cases a terminal can receive only a subset of the numerologies). In the case of two numerologies, for example, one bit is sufficient. In the more general case of up to K simultaneous numerologies, the required number of bits is ceil(ld(K)). This applies to both uplink and downlink, as well as node-to-node links more generally.

Figure 10:
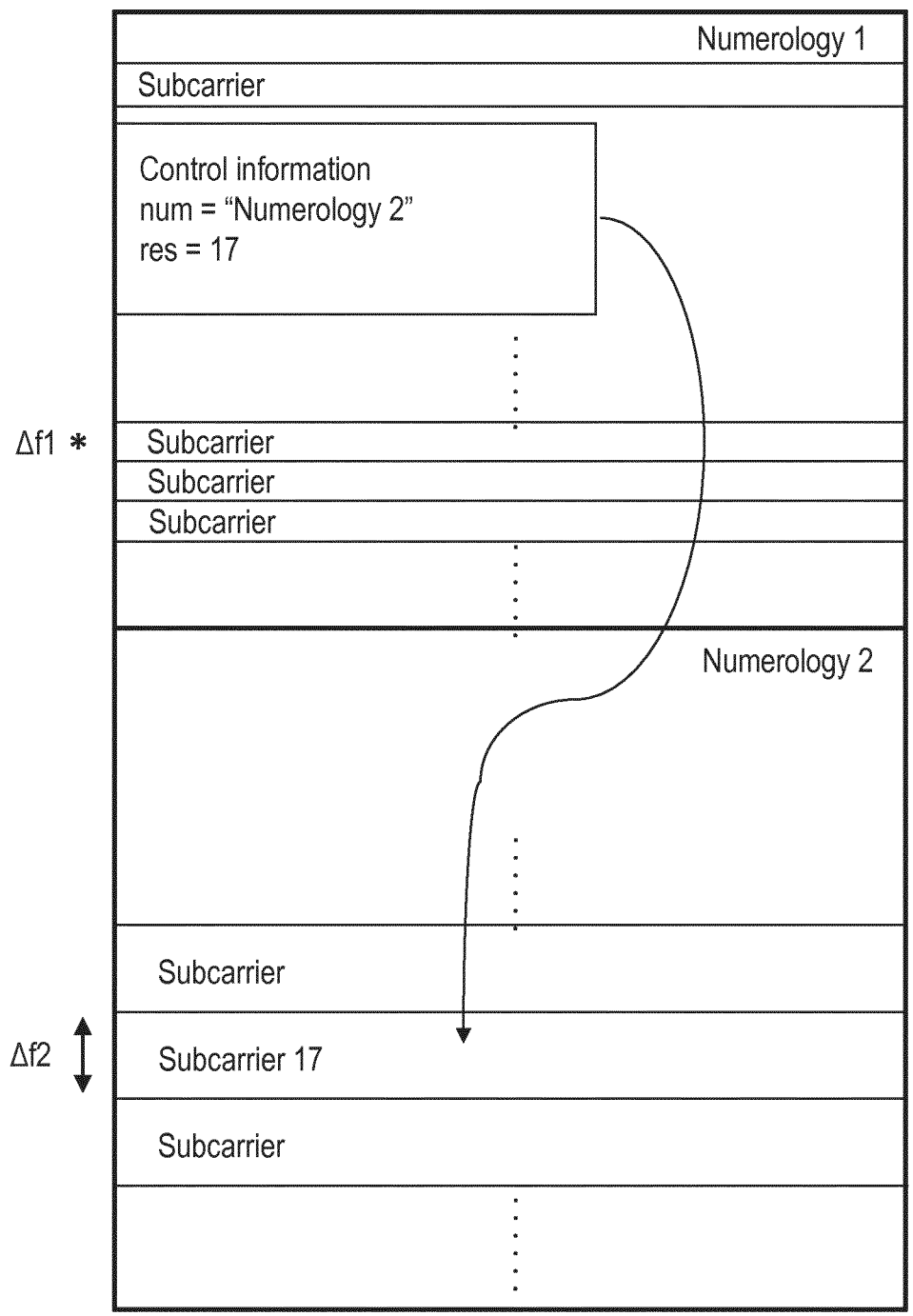
FIG. 10 illustrates an example of the transmission of resource allocation information in a bandwidth having two numerology regions.

FIG. 10 illustrates an example allocation of time-frequency resources for a mobile terminal, for the case where the terminal receives control information pointing to resources located in a region with a different numerology than the numerology used for the control information transmission. As shown in the figure, the time-frequency resources are divided into two different regions, by frequency, labeled "Numerology 1" and "Numerology 2." The Numerology 1 resources have a subcarrier spacing of $\Delta f1$, while the Numerology 2 resources have a wider subcarrier spacing, $\Delta f2$.

In the illustrated example, control information for a mobile terminal is sent using some of the Numerology 1 resources. This control information may be sent in certain time-frequency resources dedicated to one or more control channels, for example, like the Physical Downlink Control Channel (PDCCH) or Enhanced Physical Downlink Control Channel (E-PDCCH) defined in the LTE standards. The control information contains resource allocation information identifying the allocated time-frequency resources for the mobile terminal. In the illustrated example, the resource allocation information includes two fields—a "num" field having a value of "Numerology 2," and a "res" field having a value of 17. The field "num" indicates "Numerology 2", since the allocated time-frequency resources in this example are located in the region with Numerology 2. The field "res" indicates the allocated subcarriers, and thus points to subcarrier 17, as indicated in the figure. Of course, this is just one example of how resource allocation information indicating time-frequency resources allocated to the mobile terminal may be encoded. It is also possible to jointly encode "num" and "res field" into a new field "numres," for example. Further, as explained in more detail below, it is also possible to implicitly indicate some of the resource allocation information, such as the numerology for the allocated time-frequency resources.

Figure 11:
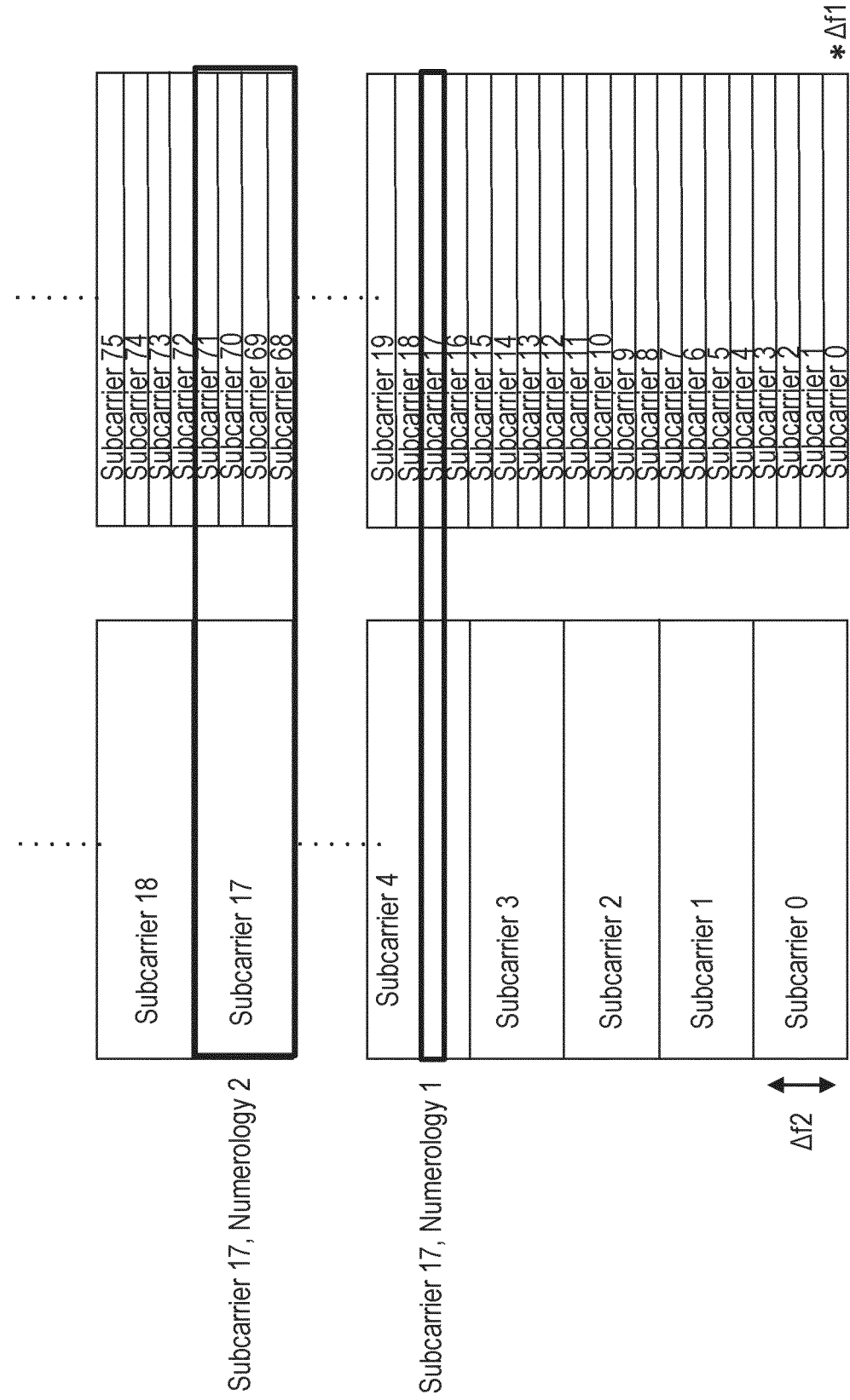
FIG. 11 compares subcarrier numbering for two different numerologies, having different subcarrier spacings/bandwidths.

When the resource allocation information includes information indicating a particular subcarrier or subcarriers, it is important that the mobile terminal receiving the resource allocation information understands which subcarrier bandwidth is assumed in the "res" field. In other words, and somewhat more generally, it is important that the mobile terminal understand which subcarrier bandwidth is assumed when encoding the indication of a particular subcarrier or subcarriers. In the illustrated example, the "res" field indicates subcarrier 17. Depending on whether this assumes a subcarrier bandwidth of $\Delta f1$ or $\Delta f2$, the allocated frequency could either be $17 \cdot \Delta f1$ or $17 \cdot \Delta f2$, respectively. This is shown in FIG. 11, which illustrates, side by side, a given frequency region divided into subcarriers of $\Delta f1$ and $\Delta f2$.

One possibility is to assume for the "res" field the numerology indicated in the "num" field, i.e., to assume that the indication of a subcarrier in the resource allocation information is encoded in terms of the subcarrier bandwidth corresponding to the allocated time-frequency resources. Another possibility is to assume for the "res" field the numerology used for the control information transmission, i.e., to assume that the indication of the subcarrier in the resource allocation information is encoded in terms of the subcarrier bandwidth corresponding to the time-frequency resources in which the resource allocation information is sent. In some embodiments, the mobile terminal may be pre-configured, e.g., with Radio Resource Control (RRC) signaling, with an indication of the numerology that should be assumed for the "res" field.

In some embodiments of the presently disclosed techniques, control information for a mobile terminal is sent in at least one of one or more search spaces that are monitored by the mobile terminal, i.e., as is currently done in LTE systems. In some embodiments, a mobile terminal has at least one search space configured where control information is transmitted with a first numerology, having a first subcarrier spacing/bandwidth, and at least one search space configured where control information is transmitted using a second numerology, having a second, differing subcarrier spacing/bandwidth.

In some of these embodiments, the same numerology that has been used to decode the control information is also assumed for the allocated resources. Here, then, the subcarrier bandwidth for the allocated time-frequency resources is implicitly indicated, by the search space in which the resource allocation information is found.

Figure 12:
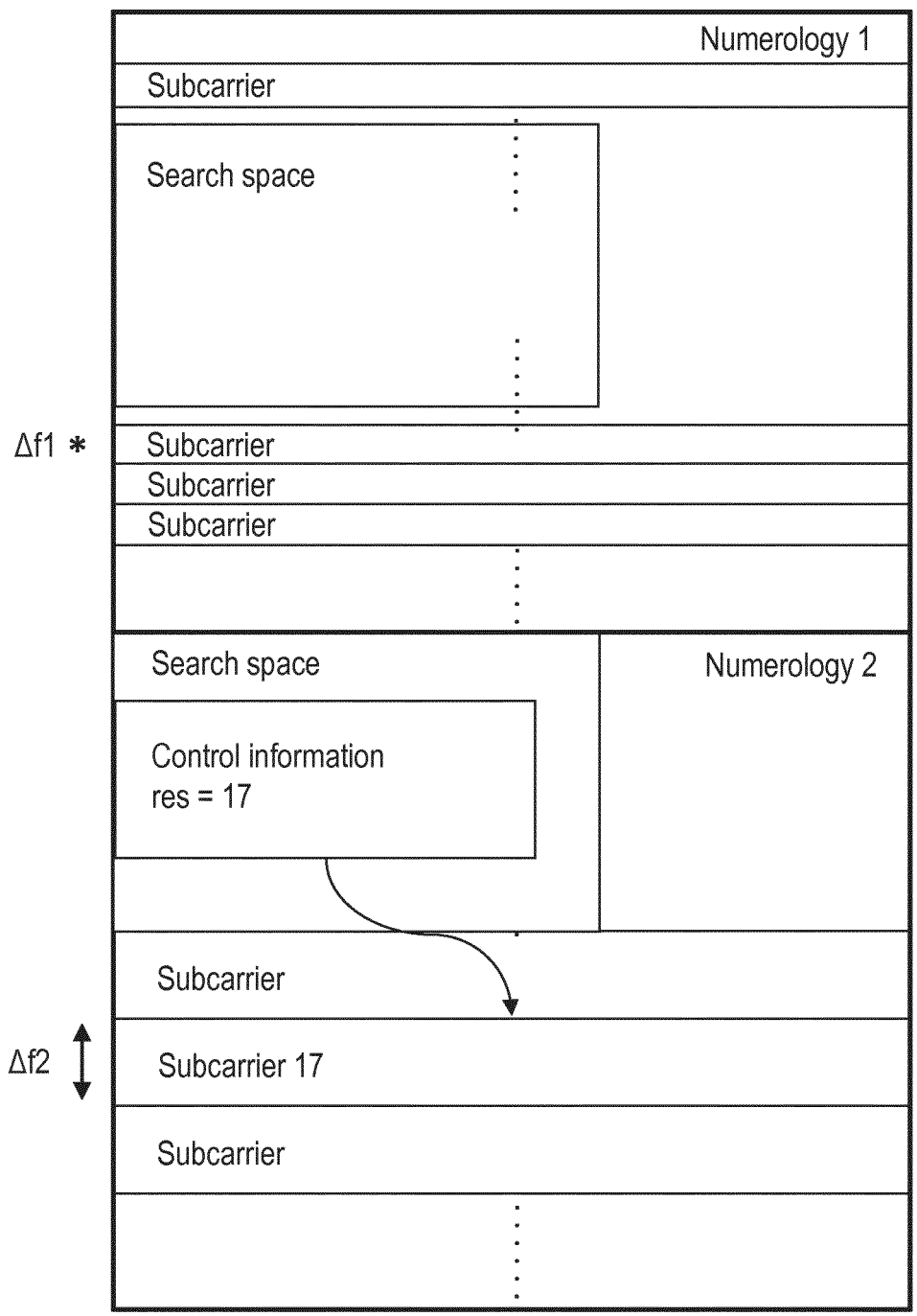
FIG. 12 illustrates another example of the transmission of resource allocation information in a bandwidth having two numerology regions.

An illustration of this approach is found in FIG. 12. In this example, the time-frequency resources are again divided into two regions, with respect to frequency, and are again labeled "Numerology 1" and "Numerology 2." In each of these regions is found a respective search space—as noted above, control information sent in each search space is modulated according to the numerology for the region in which the search space is located. In the illustrated example, resource allocation information is sent in the search space for the Numerology 2 region. No "num" field is needed, since the fact that the resource allocation information is received in the Numerology 2 search space indicates that the allocated time-frequency resources are also in the Numerology 2 region and follow the same numerology.

Again it is important that the UE is aware which numerology is assumed when encoding the resource allocation field "res." The variations discussed above are equally applicable here, although it is most intuitive to assume that any indication of a particular subcarrier is encoded in terms of the subcarrier spacing/bandwidth corresponding to the numerology for the search space in which the resource allocation information was received, which, in embodiments that operate according to this approach, is the same numerology for the allocated time-frequency resources. Typically, however not necessarily, subcarriers are indicated block-wise (e.g. Physical Resource Block (PRB) in LTE).

According to another approach for indicating the numerology applying to allocated time-frequency resources, the regions of the numerologies are semi-statically configured. A mobile terminal may be informed of the boundaries of these regions by way of RRC signaling, for example. When the mobile terminal receives control information indicating an allocation of specific time-frequency resources, the location of those time-frequency resources—i.e., in which semi-statically configured numerology region those resources fall—determines the numerology applying to the allocated time-frequency resources. Again, no "num" field or equivalent is required, with this approach, as the numerology is implicit from the specific resource allocation. Once again, however, it remains important that the mobile terminal be aware which numerology is assumed when encoding the resource allocation field—each of the variants described above for this are applicable to this alternative, as well.

In some embodiments, a mobile terminal (or other wireless device) may be configured to search for resource allocation information using a first numerology, at each of several first instances, and using a second numerology at each of several second instances. Thus, for example, a mobile terminal may be configured to search in a first numerology with a given periodicity, and in a second numerology with another periodicity. In some of these embodiments, the numerology corresponding to allocated time-frequency resources is assumed to match the numerology used by the mobile terminal when demodulating and decoding the resource allocation information.

In some embodiments, the periodicities discussed above may be such that the time instances for the two periodicities occasionally coincide. In these embodiments, there may be a priority rule between search rules, so that terminal is only required to search in a single numerology at every given time instant. Such a priority mechanism allows for critical messages to reliably coexist with lower priority messages without requiring a terminal to search two numerologies in the same time instant.

An example search pattern is shown below, in Table 1. In this example, mobile terminals search in numerology one every fifth subframe, and in numerology two every second subframe.

TABLE 1

| | Search pattern for two terminals x and y | | | | | | | | | | | | | | | |
|---|---|---|---|---|---|---|---|---|---|---|---|---|---|---|---|---|
| Numerology (subband) one | x, y | | | | y | | | | x, y | | | | | | y | |
| Numerology (subband) two | | x, y | x, y | x, y | | x, y | x, y | | | x, y | | x, y | x, y | | | x, y |
| time | 1 | 2 | 3 | 4 | 5 | 6 | 7 | 8 | 9 | 10 | 11 | 12 | 13 | 14 | 15 | 16 |

Here, each "x" in the table indicates that a first terminal, capable of receiving in only a single numerology at a time, is performing a search for control information according to the indicated numerology (and the corresponding subband, in some embodiments). Each "y" indicates that a second terminal, which can search in several numerologies simultaneously, is performing a search for control information according to the indicated numerology. It will be appreciated that the first terminal, in particular, may benefit from cross-numerology scheduling in this example.

Figure 13:
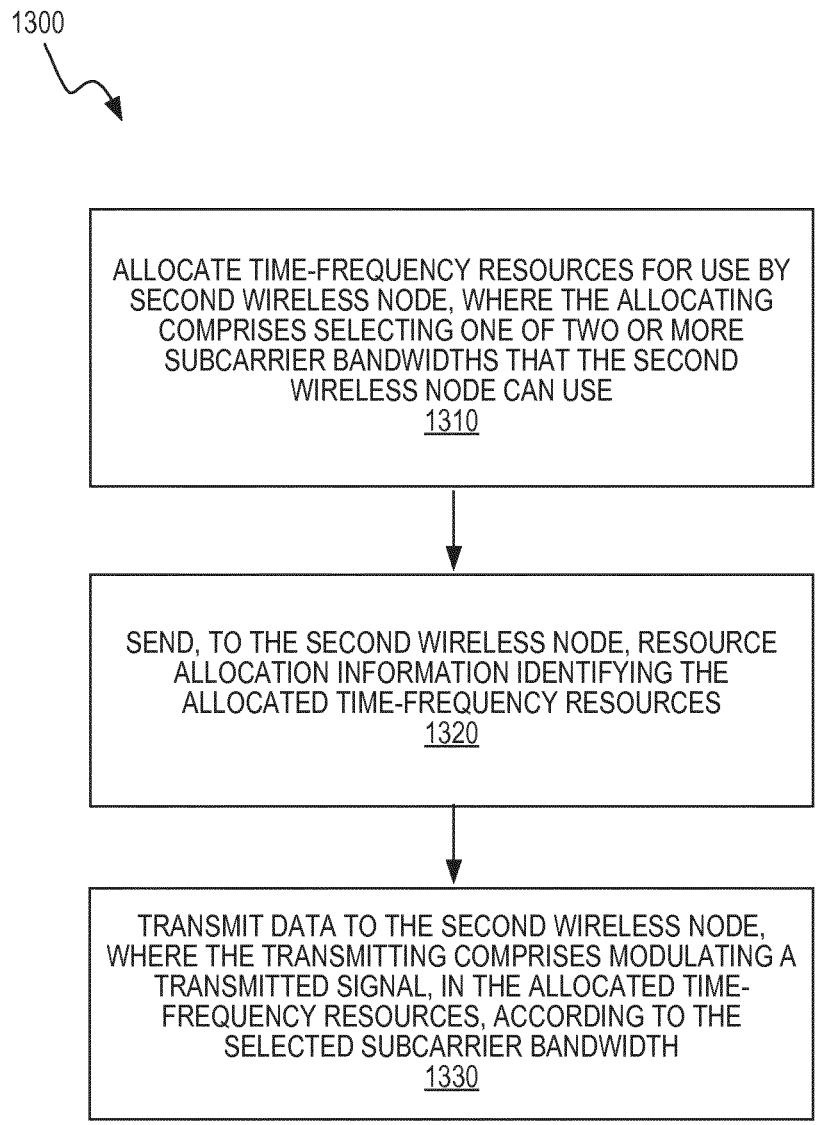
FIG. 13 illustrates a method in a first wireless node, according to some embodiments.
Figure 14:
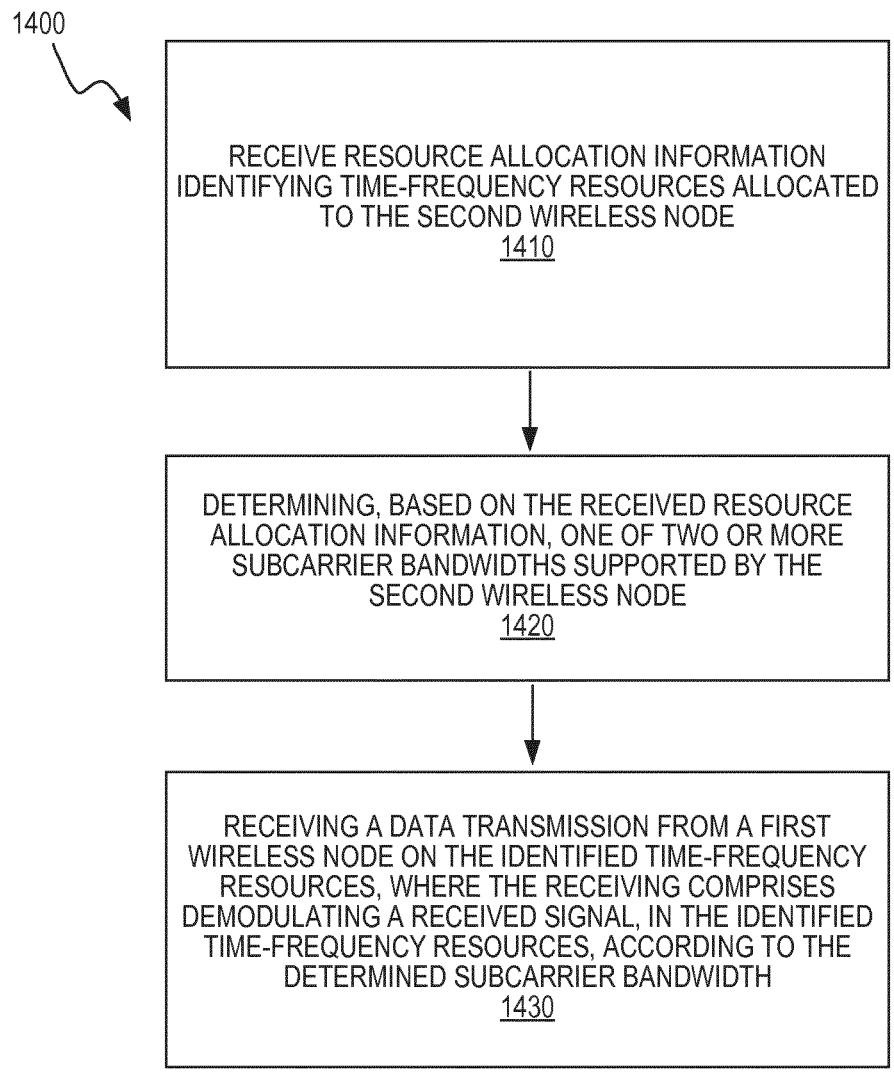
FIG. 14 illustrates a method in a second wireless node, according to some embodiments.

Given the detailed discussion and examples provided above, it will be appreciated that FIGS. 13 and 14 are process flows illustrating, respectively, an example method for allocating time-frequency resources for multicarrier modulation in a system where two or more subcarrier bandwidths can be used for the multicarrier modulation, and an example method for receiving and interpreting resource allocation information in such a system. Note that these methods may apply to uplink resource allocations, downlink resource allocations, or resource allocations for node-to-node communications more generally.

As shown at block 1310, the method 1300 illustrated in FIG. 13, which is implemented in a first wireless node, includes allocating time-frequency resources for use by a second wireless node, where said allocating comprises selecting, for use in multicarrier modulation in the allocated time-frequency resources, one of two or more subcarrier bandwidths that the second wireless node is adapted to use for modulating or demodulating of data, i.e., that the second wireless node supports (i.e., is capable of using) and/or is allowed to use. As shown at block 1320, the method further comprises sending resource allocation information to the second wireless node, the resource allocation information identifying the allocated time-frequency resources. Note, however, that the resource allocation may be performed by a different node than the node that sends the resource allocation information to the second wireless node, in some embodiments. Thus, some embodiments of the presently disclosed techniques include a node configured to carry out only the resource allocation step illustrated in FIG. 13.

As explained in some of the detailed examples provided above, in some embodiments the resource allocation information sent to the second wireless node relates to resources located in a bandwidth region corresponding to a different subcarrier spacing than the subcarrier spacing used for the transmission of the resource allocation information. In some embodiments the numerology is implicitly indicated by the numerology of the resource allocation information. That is, data and resource allocation information are always on the same numerology. In other embodiments the data and resource allocation may or may not be on same numerology.

It should be noted that the selecting of the one of two or more subcarrier bandwidths referred to above may be implicit, in some embodiments. For example, the selection of the subcarrier bandwidth may be implicit in the first wireless node's selection of particular time-frequency resources to be allocated.

As shown at block 1330, the illustrated method further includes transmitting data to the second wireless node in the allocated time-frequency resources, in some embodiments. This transmitting of data comprises modulating a transmitted signal, in the allocated time-frequency resources, according to the selected subcarrier spacing. In alternative embodiments, a similar method may instead include receiving data from the second wireless node in the allocated time-frequency resources, where the receiving of data comprises demodulating a received signal, in the allocated time-frequency resources, according to the selected subcarrier spacing.

As discussed in connection with the several detailed examples provided above, in some embodiments, the resource allocation information sent to the second wireless node includes an indication of one or more specific subcarriers in the allocated time-frequency resources. In some of these embodiments, this indication is encoded in terms of the subcarrier bandwidth that corresponds to the allocated resources. In others of these embodiments, the resource allocation information is sent using first time-frequency resources, and the indication is encoded in terms of a subcarrier bandwidth corresponding to the first time-frequency resources in which the resource allocation information is sent, the subcarrier bandwidth corresponding to the first time-frequency resources differing from the selected subcarrier bandwidth for use in the allocated time-frequency resources. In some embodiments, the one or more specific subcarriers indicated by the indicator imply the selected subcarrier bandwidth, and may also imply the encoding of the subcarrier information.

Alternatively, the resource allocation information may include an explicit indicator of a subcarrier bandwidth for the allocated time-frequency resources, in some embodiments. In some of these embodiments, this explicit indicator identifies one of two or more predetermined numerologies for multicarrier modulation, each predetermined numerology having a corresponding subcarrier bandwidth.

In some embodiments of the method generally illustrated in FIG. 13, the resource allocation information is sent in one of two or more search spaces monitored by the second wireless node. In these embodiments, the method further includes selecting the search space in which the resource allocation information is sent, based on the selected subcarrier bandwidth. In some of these embodiments, the resource allocation information is modulated onto a transmitted signal according to the selected subcarrier bandwidth.

FIG. 14 is a process flow diagram illustrating an example method 1400 for receiving and interpreting resource allocation information in a system in which two or more subcarrier bandwidths can be used for multicarrier modulation. The illustrated method may be implemented, for example, in the "second wireless node" discussed above with respect to FIG. 13.

As shown at block 1410, the illustrated method includes receiving resource allocation information identifying time-frequency resources allocated to the second wireless node. The method further includes, as shown at block 1420, determining, based on the received resource allocation information, one of two or more subcarrier bandwidths supported by the second wireless node for use in multicarrier modulation on the identified time-frequency resources.

In some embodiments, the method further includes receiving a data transmission from a first wireless node on the identified time-frequency resources, where this receiving of the data transmission comprises demodulating a received signal, in the identified time-frequency resources, according to the determined subcarrier bandwidth. This is shown at block 1430. Alternatively, in some embodiments a method similar to that shown in FIG. 14 may include transmitting data to a first wireless node on the identified time-frequency resources, where this transmitting of data comprises modulating a transmitted signal, in the identified time-frequency resources, according to the determined subcarrier bandwidth.

As should be clear from the detailed examples discussed above, in some embodiments of the illustrated method the resource allocation information includes an indicator of one or more specific subcarriers in the allocated time-frequency resources. In these embodiments, determining the applicable subcarrier bandwidth comprises determining which of the two or more possible subcarrier bandwidths corresponds to the one or more specific subcarriers. In some of these embodiments, the indicator is encoded in terms of the subcarrier bandwidth corresponding to the allocated time-frequency resources, and the method further comprises determining a frequency range for the allocated time-frequency resources based, at least in part, on the indicator and the subcarrier bandwidth corresponding to the allocated time-frequency resources. In others of these embodiments, the indicator is encoded in terms of a subcarrier bandwidth corresponding to time-frequency resources in which the resource allocation information is sent, and the method further comprises determining a frequency range for the allocated time-frequency resources based, at least in part, on the indicator and the subcarrier bandwidth corresponding to the time-frequency resources in which the resource allocation information is sent. In some of these latter embodiments, the subcarrier bandwidth corresponding to the time-frequency resources in which the resource allocation information is sent differs from the determined subcarrier bandwidth.

In some embodiments, determining the subcarrier bandwidth that is applicable to the allocated time-frequency resources comprises determining which of the two or more possible subcarrier bandwidths corresponds to the one or more specific subcarriers indicated by the indicator discussed above. In some embodiments, the resource allocation information received by the second wireless node instead comprises an explicit indicator of a subcarrier bandwidth for the allocated time-frequency resources. In these embodiments, determining the applicable subcarrier bandwidth is based on this explicit indicator. In some embodiments, this latter indicator may identify one of two or more predetermined numerologies for multicarrier modulation, each predetermined numerology having a corresponding subcarrier bandwidth.

In some embodiments of the method illustrated in FIG. 14, the method further comprises monitoring two or more search spaces, where the resource allocation information is received in one of the two or more search spaces monitored by the second wireless node. In some of these embodiments, determining the applicable subcarrier bandwidth for the allocated time-frequency resources comprises determining which of the two or more possible subcarrier bandwidths corresponds to the search space in which the resource allocation information is received. In some of these embodiments, receiving the resource allocation information comprises demodulating the resource allocation information according to the subcarrier bandwidth that corresponds to the search space in which the resource allocation information is received. In other words, the resource allocation information is sent using the same subcarrier bandwidth that applies to the allocated time-frequency resources, in these embodiments.

In some embodiments, the monitoring of two or more search spaces discussed above comprises monitoring, within a transmission-time interval, first and second search spaces using first and second subcarrier spacings, respectively, the first and second subcarrier spacings differing from one another. In other embodiments, the monitoring of two or more search spaces comprises monitoring a first search space, using a first subcarrier spacing, in each of a plurality of first transmit-time intervals, and monitoring a second search space, using a second subcarrier spacing that differs from the first subcarrier spacing, in each of a plurality of second transmit-time intervals, such that at least some of the first transmit-time intervals do not coincide with any of the second transmit-time intervals. In some of these latter embodiments, the monitoring of the first search space and the monitoring of the second search space are performed according to first and second periodicities, respectively. In some of these embodiments, the method may further comprise determining that a transmit-time interval corresponds to both the first and second periodicities and monitoring only a predetermined one of the first and second search spaces in the transmit-time interval.

The methods illustrated in FIGS. 13 and 14, and the variants discussed above, may, as a general matter, be implemented in any wireless node configured to support two or more multicarrier modulation schemes in a given frequency bandwidth. In some embodiments, the method illustrated in FIG. 13 is implemented in a wireless base station of a wireless communications network while the method illustrated in FIG. 14 is implemented in a mobile terminal. It should be understood, however, that the techniques described herein are not limited to such a configuration. The techniques could be implemented in the reverse manner, for example. In some systems, wireless devices may be configured to carry out both methods, with respect to allocations for outbound transmissions, for example.

Figure 15:
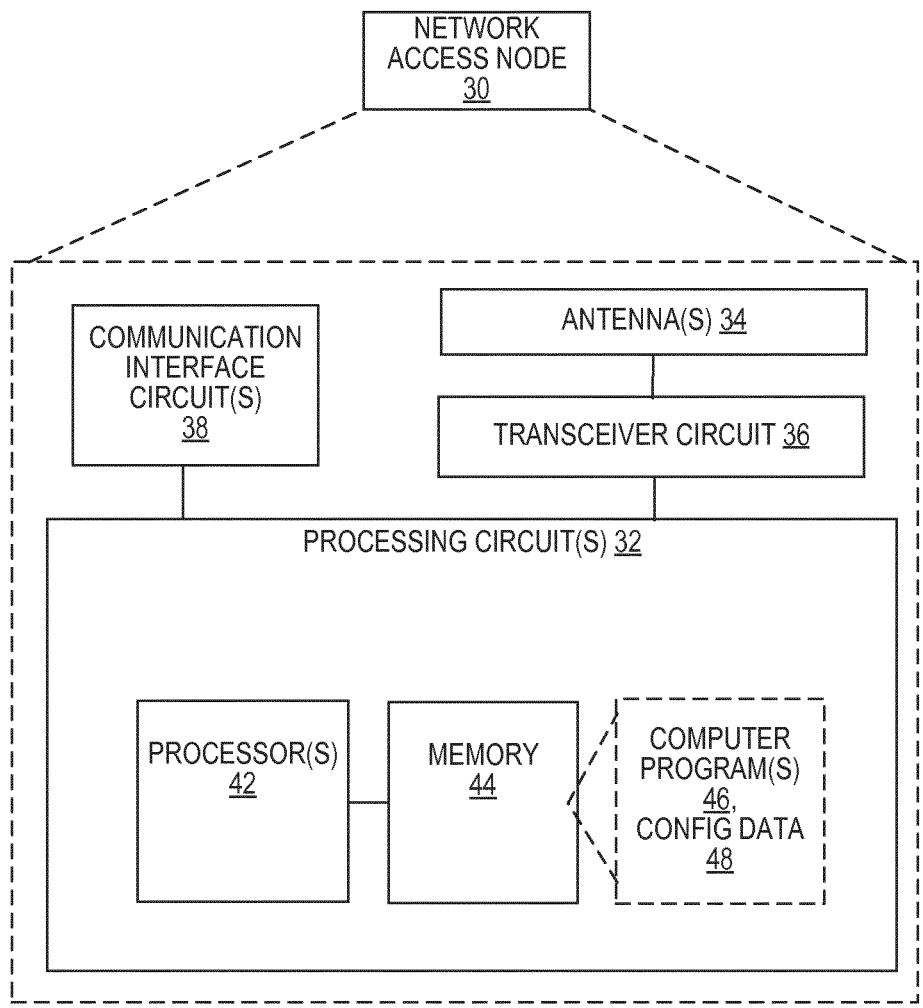
FIG. 15 illustrates a block diagram of a network access node, according to some embodiments.
Figure 16:
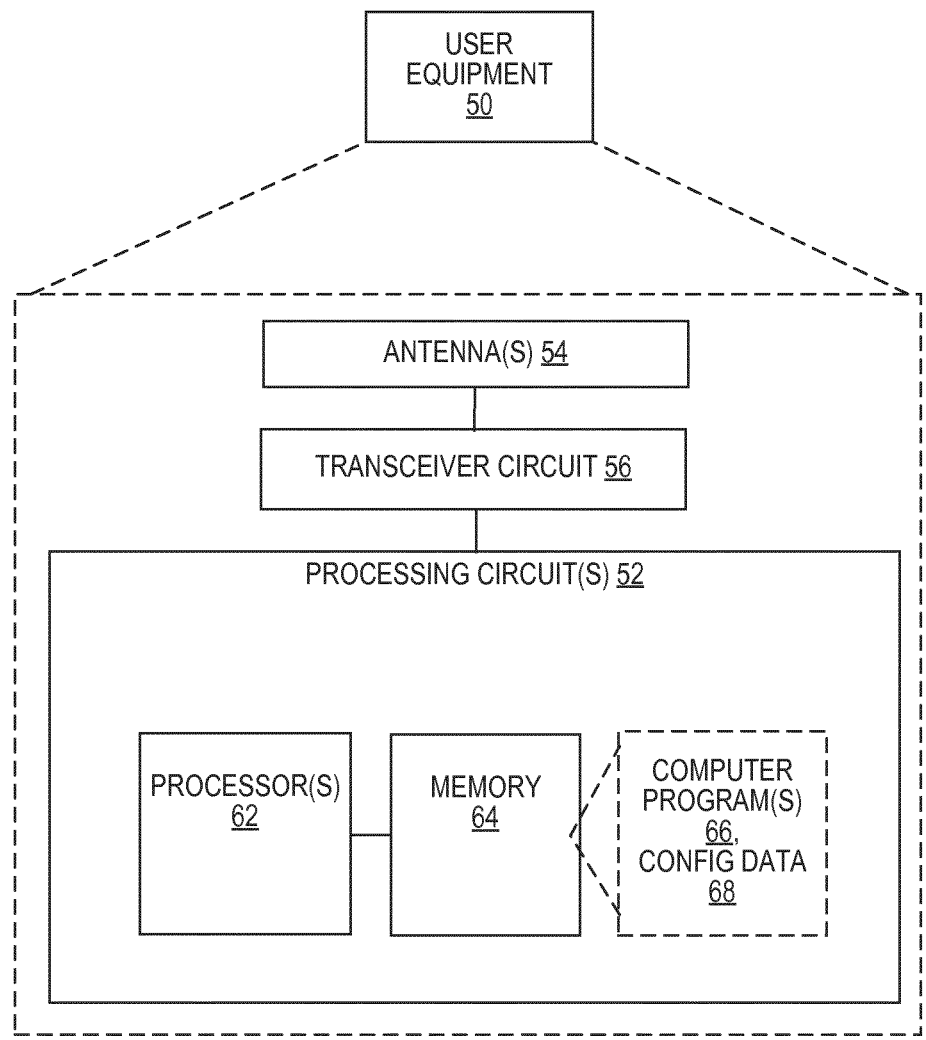
FIG. 16 illustrates a block diagram of a user equipment, according to some embodiments.

FIGS. 15 and 16 illustrate features of an example network access node (e.g., a wireless base station) and a user equipment, respectively. In the detailed discussion of those figures that follows, it is assumed that the techniques corresponding to FIG. 13 are implemented in the network access node of FIG. 15 while the techniques corresponding to FIG. 16 are implemented in the user equipment of FIG. 16. Again, however, it should be understood that the reverse situation may apply, in some cases, or that embodiments of both techniques may be implemented in a single wireless device.

FIG. 15 illustrates a diagram of a network access node 30, such as a base station, according to some embodiments. The network node 30 facilitates communication between wireless devices and the core network. The network access node 30 includes a communication interface circuit 38 includes circuitry for communicating with other nodes in the core network, radio nodes, and/or other types of nodes in the network for the purposes of providing data and cellular communication services. The network access node 30 communicates with wireless devices via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network access node 30 also includes one or more processing circuits 32 that are operatively associated with the communication interface circuit 38 or transceiver circuit 36. The network access node 30 uses the communication interface circuit 38 to communicate with network nodes and the transceiver 36 to communicate with user equipments. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network access node 30. Here, "non-transitory" means permanent, semi-permanent, or at least temporarily persistent storage and encompasses both long-term storage in non-volatile memory and storage in working memory, e.g., for program execution.

According to various embodiments of the techniques described herein, a transmitter node and/or a receiver node can perform communications using various combinations of the multicarrier modulation and demodulation techniques described in FIGS. 5-9, or other multicarrier modulation techniques. For example, referring back to FIG. 15, the processor 42 of the processing circuit 32 of network access node 30 may execute a computer program 46 stored in the memory 44 that configures the processor 42 to operate the network access node 30 as a transmitter node that performs multicarrier modulation. Processing circuit 32 may comprise specialized digital hardware for performing DFT/IDFT processing, in cooperation with one or more program-based processors, in some embodiments. In some embodiments, processor 42 is configured, for example, to form a first signal using multicarrier modulation and having a first multicarrier modulation numerology, and to form a second signal using multicarrier modulation and having a second multicarrier modulation numerology, the first and second numerologies having different subcarrier bandwidths, for example. The processor 42 is further configured to control the transceiver circuit 36 to simultaneously transmit the first and second signals in a frequency band, such that the first and second signals are frequency-domain multiplexed in the frequency band.

The processor 42 of the processing circuit 32 may be further configured to execute a computer program 46 stored in the memory 44 that configures the processor 42 to operate the network access node 30 to carry out the method illustrated in FIG. 13, or variants thereof. The processor 42 is thus configured to, for example, allocate time-frequency resources for use by a second wireless node, where said allocating comprises selecting, for use in multicarrier modulation in the allocated time-frequency resources, one of two or more subcarrier bandwidths that the second wireless node is adapted to use for modulating or demodulating of data. The processor 42 may be further configured to send resource allocation information to the second wireless node, using transceiver circuit 36, the resource allocation information identifying the allocated time-frequency resources.

The network access node 30 shown in FIG. 15 may be referred to as a node, network node or a radio network node. Network access node 30 can be any kind of network access node that may include a base station, radio base station, base transceiver station, evolved Node B (eNodeB), Node B, relay node, access point, wireless access point, radio access point, UltraDense Network (UDN)/Software Defined Network (SDN) radio access node, Remote Radio Unit (RRU), Remote Radio Head (RRH), etc.

FIG. 16 illustrates a diagram of a wireless device, such as a user equipment 50, according to some embodiments. To ease explanation, the user equipment 50 may also be considered to represent any wireless device that may operate in a network. The UE 50 herein can be any type of wireless device capable of communicating with network node or another UE over radio signals. The UE 50 may also be radio communication device, target device, device to device (D2D) UE, machine type UE or UE capable of machine to machine communication (M2M), a sensor equipped with UE, PDA (personal digital assistant), Tablet, mobile terminals, smart phone, laptop embedded equipped (LEE), laptop mounted equipment (LME), USB dongles, Customer Premises Equipment (CPE), etc.

Accordingly the first wireless node and/or the second wireless node can be any of the above mentioned wireless devices or network nodes.

The UE 50 communicates with a radio node or base station, such as network access node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with the radio transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50, e.g., using processing circuitry 52, may be configured to perform all or some of the modulation and demodulation techniques illustrated in FIGS. 5-9. For example, the processor 62 of the processor circuit 52 may execute a computer program 66 stored in the memory 64 that configures the processor 62 to operate as the second wireless node, as discussed above. The processing circuit 52 of the UE 50 may thus be configured to perform one or more methods for receiving and interpreting resource allocation information, for example, such as the method illustrated in FIG. 14, and variants thereof. For instance, the processing circuit 52 may be configured to receive resource allocation information, via transceiver circuit 56, where the resource allocation information identifies time-frequency resources allocated to the second wireless node. The processing circuit may be further configured to determine, based on the received resource allocation information, one of two or more subcarrier bandwidths supported by the second wireless node for use in multicarrier modulation on the identified time-frequency resources.

Figure 17:
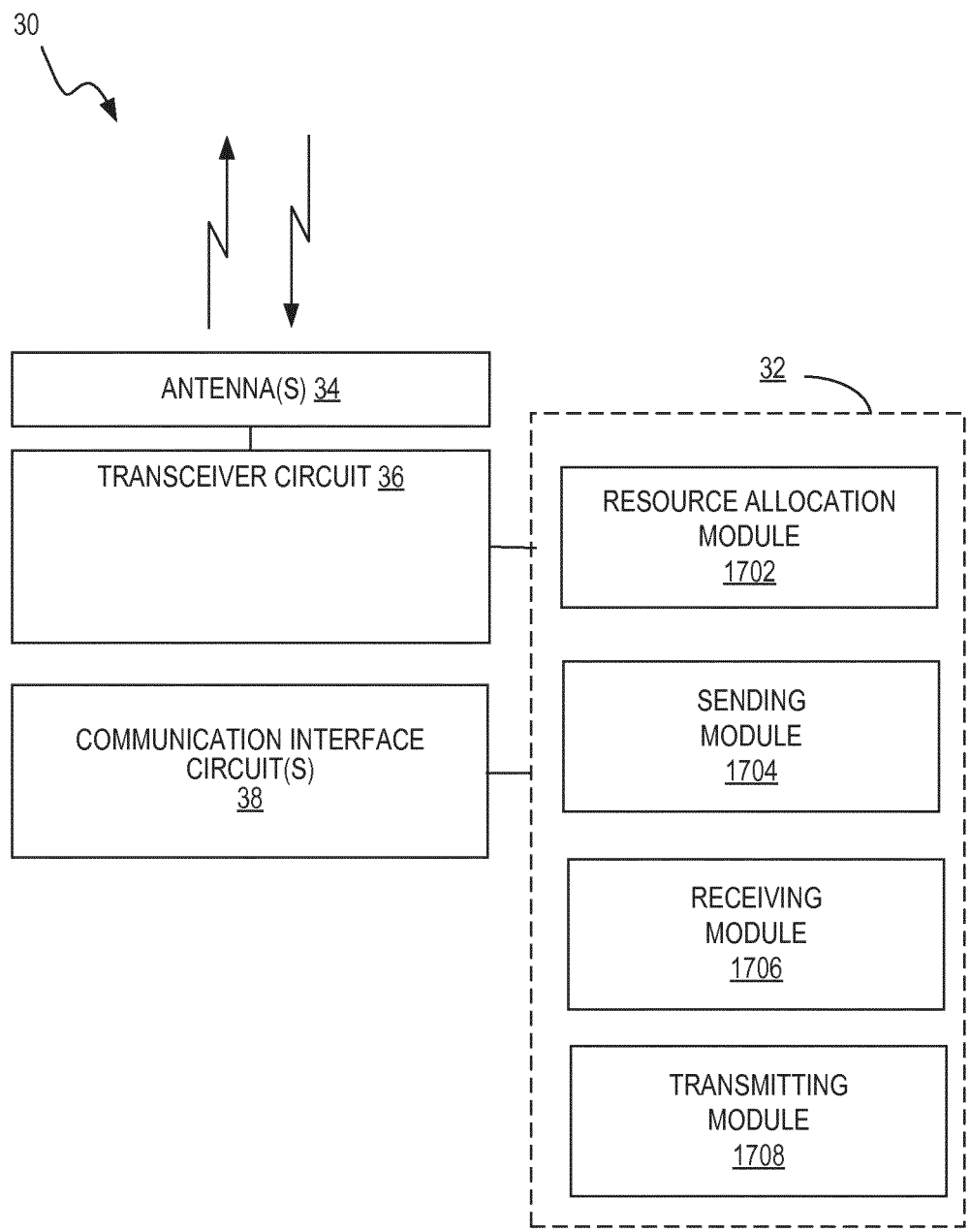
FIG. 17 illustrates a functional implementation of a network access node, according to some embodiments.
Figure 18:
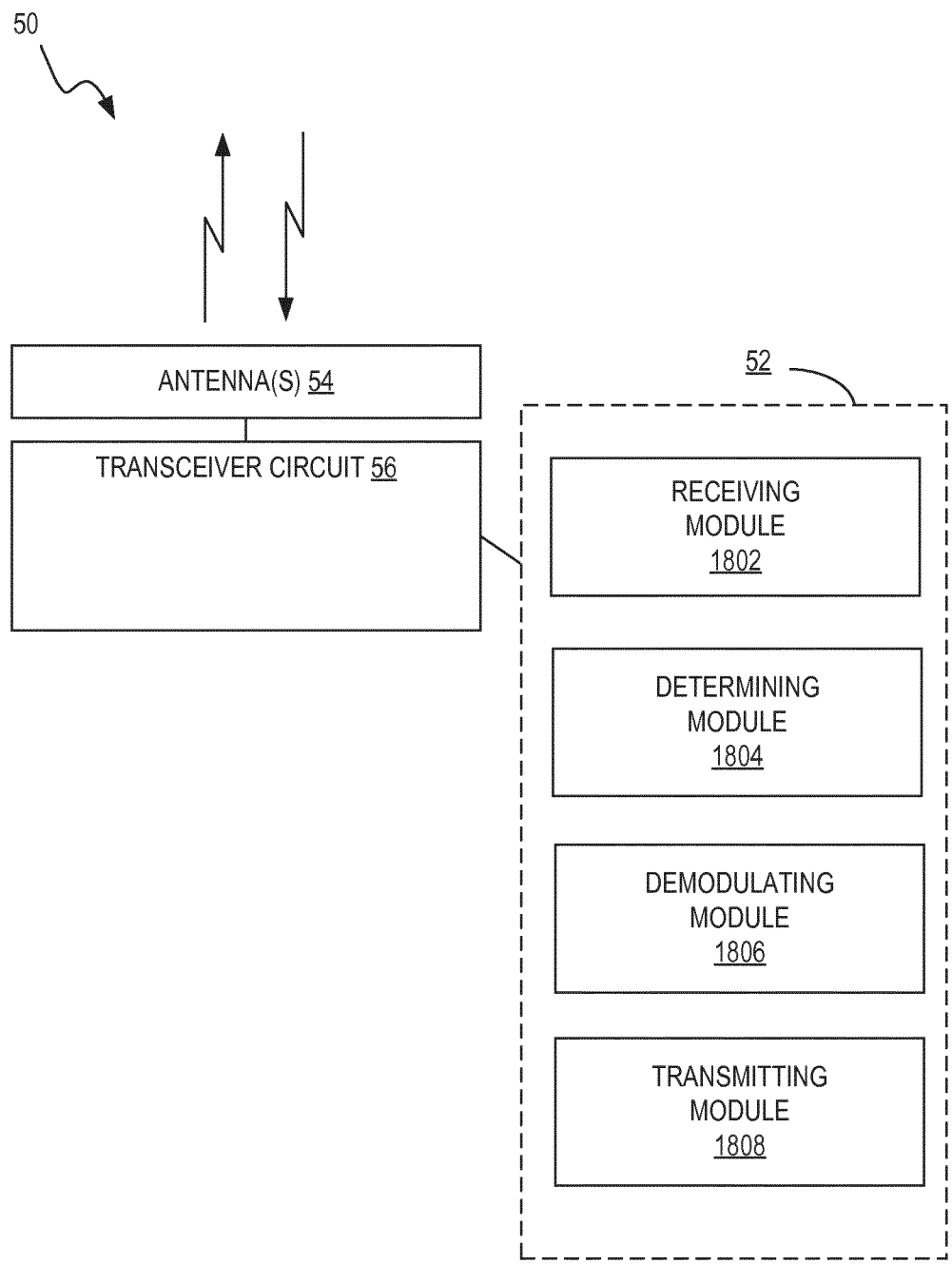
FIG. 18 illustrates a functional implementation of a user equipment, according to some embodiments.

It should be appreciated that the processing circuits 32 and 52 of FIGS. 15 and 16, respectively, can be understood to implement a number of functional modules, where each functional module may represent a module of software or firmware executing on a processing circuit, or a functional grouping of digital hardware, or a combination of both. FIGS. 17 and 18 thus illustrate alternative views of network access node 30 and user equipment 50, where one or more of the techniques described above are embodied in functional modules.

FIG. 17 illustrates an example functional module or circuit architecture as may be implemented in a node operating as a "first wireless node" according to any of the techniques described above. The illustrated embodiment at least functionally includes: a resource allocation module 1702 for allocating time-frequency resources for use by a second wireless node, such that the allocating comprises selecting, for use in multicarrier modulation in the allocated time-frequency resources, one of two or more subcarrier bandwidths that the second wireless node is adapted to use for modulating or demodulating of data; and a sending module 1704 for sending resource allocation information to the second wireless node, the resource allocation information identifying the allocated time-frequency resources. The illustrated embodiment further includes a receiving module 1706, which in some embodiments may be configured for receiving data from the second wireless node in the allocated time-frequency resources, where the receiving of data comprises demodulating a received signal, in the allocated time-frequency resources, according to the selected subcarrier spacing. The illustrated embodiment further includes a transmitting module 1708, which in some embodiments may be configured for transmitting data to the second wireless node in the allocated time-frequency resources, where the transmitting of data comprises modulating a transmitted signal, in the allocated time-frequency resources, according to the selected subcarrier spacing. It will be appreciated that all of the several variations of FIG. 13 described above are equally applicable to the apparatus shown in FIG. 17.

FIG. 18 illustrates an example functional module or circuit architecture as may be implemented in a node operating as the "second wireless node" referred to above, e.g., based on the processing circuitry 52 of FIG. 16. The illustrated embodiment at least functionally includes: a receiving module 1802 for receiving resource allocation information identifying time-frequency resources allocated to the second wireless node; and a determining module 1804 for determining, based on the received resource allocation information, one of two or more subcarrier bandwidths supported by the second wireless node for use in multicarrier modulation on the identified time-frequency resources. The illustrated embodiment further includes a demodulating module 1806, which in some embodiments is configured to receive a data transmission from a first wireless node on the identified time-frequency resources, where the receiving of the data transmission comprises demodulating a received signal, in the identified time-frequency resources, according to the determined subcarrier bandwidth. The illustrated embodiment also includes a transmitting module 1808, which in some embodiments is configured to transmit data to a first wireless node on the identified time-frequency resources, where the transmitting of data comprises modulating a transmitted signal, in the identified time-frequency resources, according to the determined subcarrier bandwidth. It will be appreciated that all of the several variations of FIG. 14 described above are equally applicable to the apparatus shown in FIG. 18.

Among the advantages of the various techniques described herein is that they enable better resource utilization in a system using Filtered OFDM or, more generally, using multi-mode multicarrier modulation. By facilitating better resource utilization, these techniques can increase system capacity in a wireless system.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a first wireless node, the method comprising:
allocating time-frequency resources for use by a second wireless node, wherein said allocating comprises selecting, for use in multicarrier modulation in the allocated time-frequency resources, one of two or more subcarrier spacings that the second wireless node is configured to use for modulating or demodulating of data, wherein the two or more subcarrier spacings coexist in different portions of a frequency band; and sending resource allocation information to the second wireless node, the resource allocation information identifying the allocated time-frequency resources.

2. The method of claim 1, wherein said resource allocation information relates to resources located in a bandwidth region corresponding to a different subcarrier spacing than the subcarrier spacing used for the transmission of the resource allocation information.

3. The method of claim 1, wherein said selecting of the one of two or more subcarrier spacings is implicit in a selection of particular time-frequency resources to be allocated.

4. The method of claim 1, further comprising transmitting data to the second wireless node in the allocated time-frequency resources, wherein said transmitting data comprises modulating a transmitted signal, in the allocated time-frequency resources, according to the selected subcarrier spacing.

5. The method of claim 1, further comprising receiving data from the second wireless node in the allocated time-frequency resources, wherein said receiving data comprises demodulating a received signal, in the allocated time-frequency resources, according to the selected subcarrier spacing.

6. The method of claim 1, wherein the resource allocation information is sent in one of two or more search spaces monitored by the second wireless node, the method further comprising selecting the search space in which the resource allocation information is sent, based on the selected subcarrier spacing.

7. The method of claim 6, wherein the resource allocation information is modulated onto a transmitted signal according to the selected subcarrier spacing.

8. The method of claim 1, wherein the resource allocation information includes an indication of one or more specific subcarriers in the allocated time-frequency resources.

9. The method of claim 8, wherein said indication is encoded in terms of the subcarrier spacing corresponding to the allocated resources.

10. The method of claim 8, wherein the resource allocation information is sent using first time-frequency resources, and wherein said indication is encoded in terms of a subcarrier spacing corresponding to the first time-frequency resources in which the resource allocation information is sent, the subcarrier spacing corresponding to the first time-frequency resources differing from the selected subcarrier spacing for use in the allocated time-frequency resources.

11. The method of claim 8, wherein the resource allocation information further comprises an indicator of a subcarrier spacing for the allocated time-frequency resources.

12. The method of claim 11, wherein the indicator of the subcarrier spacing for the allocated time-frequency resources identifies one of two or more predetermined numerologies for multicarrier modulation, each predetermined numerology having a corresponding subcarrier spacing.

13. The method of claim 8, wherein the one or more specific subcarriers indicated by the indicator imply the selected subcarrier spacing.

14. A method, in a second wireless node, the method comprising:

receiving resource allocation information identifying time-frequency resources allocated to the second wireless node; and determining, based on the received resource allocation information, one of two or more subcarrier spacings supported by the second wireless node for use in multicarrier modulation on the identified time-frequency resources for modulating or demodulating of data, wherein the two or more subcarrier spacings coexist in different portions of a frequency band.

15. The method of claim 14, further comprising receiving a data transmission from a first wireless node on the identified time-frequency resources, wherein said receiving of the data transmission comprises demodulating a received signal, in the identified time-frequency resources, according to the determined subcarrier spacing.

16. The method of claim 14, further comprising transmitting data to a first wireless node on the identified time-frequency resources, wherein said transmitting data comprises modulating a transmitted signal, in the identified time-frequency resources, according to the determined subcarrier spacing.

17. The method of claim 14, wherein the resource allocation information includes an indicator of one or more specific subcarriers in the allocated time-frequency resources, wherein said determining comprises determining which of the two or more possible subcarrier spacings corresponds to the one or more specific subcarriers.

18. The method of claim 17, wherein said indicator is encoded in terms of the subcarrier spacing corresponding to the allocated time-frequency resources, and wherein said method further comprises determining a frequency range for the allocated time-frequency resources based, at least in part, on the indicator and the subcarrier spacing corresponding to the allocated time-frequency resources.

19. The method of claim 17, wherein said indicator is encoded in terms of a subcarrier spacing corresponding to time-frequency resources in which the resource allocation information is sent, and wherein said method further comprises determining a frequency range for the allocated time-frequency resources based, at least in part, on the indicator and the subcarrier spacing corresponding to the time-frequency resources in which the resource allocation information is sent.

20. The method of claim 19, wherein the subcarrier spacing corresponding to the time-frequency resources in which the resource allocation information is sent differs from the determined subcarrier spacing.

21. The method of claim 17, wherein the resource allocation information further comprises an indicator of a subcarrier spacing for the allocated time-frequency resources, and wherein said determining is based on the indicator.

22. The method of claim 21, wherein the indicator of the subcarrier spacing for the allocated time-frequency resources identifies one of two or more predetermined numerologies for multicarrier modulation, each predetermined numerology having a corresponding subcarrier spacing.

23. The method of claim 14, the method further comprising monitoring two or more search spaces, wherein the resource allocation information is received in one of the two or more search spaces monitored by the second wireless node, and wherein said determining comprises determining which of the two or more possible subcarrier spacings corresponds to the search space in which the resource allocation information is received.

24. The method of claim 23, wherein receiving the resource allocation information comprises demodulating the resource allocation information according to the subcarrier spacing that corresponds to the search space in which the resource allocation information is received.

25. The method of claim 23, wherein said monitoring of two or more search spaces comprises monitoring, within a transmission-time interval, first and second search spaces using first and second subcarrier bandwidths spacing, respectively, the first and second subcarrier spacings differing from one another.

26. The method of claim 23, wherein said monitoring of two or more search spaces comprises monitoring a first search space, using a first subcarrier spacing, in each of a plurality of first transmit-time intervals, and monitoring a second search space, using a second subcarrier spacing that differs from the first subcarrier bandwidth, in each of a plurality of second transmit-time intervals, such that at least some of the first transmit-time intervals do not coincide with any of the second transmit-time intervals.

27. The method of claim 26, wherein the monitoring of the first search space and the monitoring of the second search space are performed according to first and second periodicities, respectively.

28. The method of claim 27, further comprising determining that a transmit-time interval corresponds to both the first and second periodicities and monitoring only a predetermined one of the first and second search spaces in the transmit-time interval.

29. The method of claim 27, wherein said determining comprises determining which of the two or more possible subcarrier spacings corresponds to the one or more specific subcarriers indicated by the indicator.

30. A first wireless node comprising:
a radio transceiver circuit, and
a processing circuit configured to:
allocate time-frequency resources for use by a second wireless node, wherein said allocating comprises selecting, for use in multicarrier modulation in the allocated time-frequency resources, one of two or more subcarrier spacings that the second wireless node is configured to use for modulating or demodulating of data, wherein the two or more subcarrier spacings coexist in different portions of a frequency band; and
send resource allocation information to the second wireless node, using the radio transceiver circuit, the resource allocation information identifying the allocated time-frequency resources.

31. The first wireless node of claim 30, wherein the resource allocation information relates to resources located in a bandwidth region corresponding to a different subcarrier spacing than the subcarrier spacing used for the transmission of the resource allocation information.

32. The first wireless node of claim 30, wherein said selecting of the one of two or more subcarrier spacings is implicit in the processing circuit's selection of particular time-frequency resources to be allocated.

33. The first wireless node of claim 30, wherein the processing circuit is further configured to transmit data to the second wireless node in the allocated time-frequency resources, using the radio transceiver circuit, by modulating a transmitted signal, in the allocated time-frequency resources, according to the selected subcarrier spacing.

34. The first wireless node of claim 30, wherein the processing circuit is further configured to receive data from the second wireless node in the allocated time-frequency resources by demodulating a received signal, in the allocated time-frequency resources, according to the selected subcarrier spacing.

35. The first wireless node of claim 30, wherein the processing circuit is configured to send the resource allocation information in one of two or more search spaces monitored by the second wireless node, and wherein the processing circuit is further configured to select the search space in which the resource allocation information is sent based on the selected subcarrier spacing.

36. The first wireless node of claim 35, wherein the processing circuit is configured to modulate the resource allocation information onto a transmitted signal according to the selected subcarrier spacing.

37. The first wireless node of claim 30, wherein the processing circuit is configured to include, in the resource allocation information, an indication of one or more specific subcarriers in the allocated time-frequency resources.

38. The first wireless node of claim 37, wherein the processing circuit is configured to encode the indication in terms of the subcarrier spacing corresponding to the allocated resources.

39. The first wireless node of claim 37, wherein the processing circuit is configured to send the resource allocation information using first time-frequency resources and is further configured to encode the indication in terms of a subcarrier spacing corresponding to the first time-frequency resources in which the resource allocation information is sent, the subcarrier spacing corresponding to the first time-frequency resources differing from the selected subcarrier spacing for use in the allocated time-frequency resources.

40. The first wireless node of claim 37, wherein the processing circuit is further configured to include, in the resource allocation information, an indicator of a subcarrier spacing for the allocated time-frequency resources.

41. The first wireless node of claim 40, wherein the indicator of the subcarrier spacing for the allocated time-frequency resources identifies one of two or more predetermined numerologies for multicarrier modulation, each predetermined numerology having a corresponding subcarrier spacing.

42. The first wireless node of claim 37, wherein the one or more specific subcarriers indicated by the indicator imply the selected subcarrier spacing.

43. A second wireless node comprising:
a radio transceiver circuit, and
a processing circuit configured to:
receive resource allocation information identifying time-frequency resources allocated to the second wireless node; and
determine, based on the received resource allocation information, one of two or more subcarrier spacings supported by the second wireless node for use in multicarrier modulation on the identified time-frequency resources for modulating or demodulating of data, wherein the two or more subcarrier spacings coexist in different portions of a frequency band.

44. The second wireless node of claim 43, wherein the processing circuit is further configured to receive a data transmission from a first wireless node on the identified time-frequency resources, using the radio transceiver circuit, and to demodulate the data transmission, in the identified time-frequency resources, according to the determined subcarrier spacing.

45. The second wireless node of claim 43, wherein the processing circuit is further configured to transmit data to a first wireless node on the identified time-frequency resources, using the radio transceiver circuit, wherein said transmitting data comprises modulating a transmitted signal, in the identified time-frequency resources, according to the determined subcarrier spacing.

46. The second wireless node of claim 43, wherein the resource allocation information includes an indicator of one or more specific subcarriers in the allocated time-frequency resources, and wherein the processing circuit is configured to determine the subcarrier spacing for use in the identified time-frequency resources by determining which of the two or more possible subcarrier spacings corresponds to the one or more specific subcarriers.

47. The second wireless node of claim 46, wherein said indicator is encoded in terms of the subcarrier spacing corresponding to the allocated time-frequency resources, and wherein the processing circuit is further configured to determine a frequency range for the allocated time-frequency resources based, at least in part, on the indicator and the subcarrier spacing corresponding to the allocated time-frequency resources.

48. The second wireless node of claim 46, wherein the resource allocation information is received in first time-frequency resources, wherein said indicator is encoded in terms of a subcarrier spacing corresponding to the time-frequency resources in which the resource allocation information is sent, and wherein the processing circuit is further configured to determine a frequency range for the allocated time-frequency resources based, at least in part, on the indicator and the subcarrier spacing corresponding to the time-frequency resources in which the resource allocation information is sent.

49. The second wireless node of claim 48, wherein the subcarrier spacing corresponding to the time-frequency resources in which the resource allocation information is sent differs from the determined subcarrier spacing.

50. The second wireless node of claim 46, wherein the resource allocation information further comprises an indicator of a subcarrier spacing for the allocated time-frequency resources, and wherein the processing circuit is configured to determine the subcarrier spacing for use in the identified time-frequency resources based on the indicator.

51. The second wireless node of claim 50, wherein the indicator of the subcarrier spacing for the allocated time-frequency resources identifies one of two or more predetermined numerologies for multicarrier modulation, each predetermined numerology having a corresponding subcarrier spacing.

52. The second wireless node of claim 46, wherein the processing circuit is configured to determine the subcarrier spacing for use in the identified time-frequency resources by determining which of the two or more possible subcarrier spacings corresponds to the one or more specific subcarriers indicated by the indicator.

53. The second wireless node of claim 43, wherein the second wireless node is further configured to monitor two or more search spaces, wherein the resource allocation information is received in one of the two or more search spaces monitored by the second wireless node, and wherein the processing circuit is configured to determine the subcarrier spacing for use in the identified time-frequency resources by determining which of the two or more possible subcarrier spacings corresponds to the search space in which the resource allocation information is received.

54. The second wireless node of claim 53, wherein the processing circuit is configured to demodulate the resource allocation information according to the subcarrier spacing that corresponds to the search space in which the resource allocation information is received.

55. The second wireless node of claim 53, wherein the processing circuit is configured to monitor, within a transmission-time interval, first and second search spaces using first and second subcarrier spacings, respectively, the first and second subcarrier spacings differing from one another.

56. The second wireless node of claim 53, wherein the processing circuit is configured to monitor a first search space, using a first subcarrier spacing, in each of a plurality of first transmit-time intervals, and to monitor a second search space, using a second subcarrier spacing that differs from the first subcarrier bandwidth, in each of a plurality of second transmit-time intervals, such that at least some of the first transmit-time intervals do not coincide with any of the second transmit-time intervals.

57. The second wireless node of claim 56, wherein the processing circuit is configured to monitor the first search space and the second search space according to first and second periodicities, respectively.

58. The second wireless node of claim 57, wherein the processing circuit is further configured to determine that a transmit-time interval corresponds to both the first and second periodicities and to monitor only a predetermined one of the first and second search spaces in the transmit-time interval.

59. A non-transitory computer-readable medium comprising, stored thereupon, a computer program product comprising program instructions configured for execution by a processor in a first wireless node, wherein the program instructions are configured so as to cause the first wireless node to:
  allocate time-frequency resources for use by a second wireless node, wherein said allocating comprises selecting, for use in multicarrier modulation in the allocated time-frequency resources, one of two or more subcarrier spacings that the second wireless node is configured to use for modulating or demodulating of data, wherein the two or more subcarrier spacings coexist in different portions of a frequency band; and
  send resource allocation information to the second wireless node, using the radio transceiver circuit, the resource allocation information identifying the allocated time-frequency resources.

60. A non-transitory computer-readable medium comprising, stored thereupon, a computer program product comprising program instructions configured for execution by a processor in a second wireless node, wherein the program instructions are configured so as to cause the second wireless node to:
  receive resource allocation information identifying time-frequency resources allocated to the second wireless node; and
  determine, based on the received resource allocation information, one of two or more subcarrier spacings supported by the second wireless node for use in multicarrier modulation on the identified time-frequency resources for modulating or demodulating of data, wherein the two or more subcarrier spacings coexist in different portions of a frequency band.

61. A method, comprising:
  in a first wireless node, allocating time-frequency resources for use by a second wireless node, wherein said allocating comprises selecting, for use in multicarrier modulation in the allocated time-frequency resources, one of two or more subcarrier spacings that the second wireless node is configured to use for modulating or demodulating of data, wherein the two or more subcarrier spacings coexist in different portions of a frequency band, and sending resource allocation information to the second wireless node, the resource allocation information identifying the allocated time-frequency resources; and in the second wireless node, receiving resource allocation information identifying the time-frequency resources allocated to the second wireless node and determining, based on the received resource allocation information, one of two or more subcarrier spacings supported by the second wireless node for use in multicarrier modulation on the identified time-frequency resources for modulating or demodulating of data, wherein the two or more subcarrier spacings coexist in different portions of a frequency band.

* * * * *